United States Patent
Shibata et al.

(10) Patent No.: US 6,382,518 B1
(45) Date of Patent: May 7, 2002

(54) VEHICLE AIR CONDITIONER WITH SIDE FACE OPENING

(75) Inventors: Kazuji Shibata, Kariya; Yoshio Yoshida, Handa; Masato Inuzuka, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/686,008

(22) Filed: Oct. 10, 2000

(30) Foreign Application Priority Data

| Oct. 18, 1999 | (JP) | 11-295139 |
| Dec. 22, 1999 | (JP) | 11-364895 |
| Aug. 22, 2000 | (JP) | 12-251406 |

(51) Int. Cl.[7] ............................................... B60H 1/02
(52) U.S. Cl. ................... 237/12.3 B; 454/156; 454/121
(58) Field of Search ................................ 454/121, 156; 237/12.3 B, 12.3 A; 165/42

(56) References Cited

U.S. PATENT DOCUMENTS 5,711,368 A * 1/1998 Ito et al. ........................ 165/42
5,803,160 A * 9/1998 Danieau ........................ 165/42
5,934,989 A * 8/1999 Yamamoto ................. 454/156
5,954,578 A * 9/1999 Takasaki .................... 454/121
5,967,890 A * 10/1999 Loup et al. ................. 454/121

FOREIGN PATENT DOCUMENTS

JP  A-10-166838  6/1998

* cited by examiner

*Primary Examiner*—Harold Joyce
*Assistant Examiner*—Derek S. Boles
(74) *Attorney, Agent, or Firm*—Harness, Dickey & Pierce, PLC

(57) ABSTRACT

In a vehicle air conditioner, an air conditioning case has a center face opening through which air is blown toward a center upper side of a passenger compartment in a vehicle right-left direction, a side face opening through which air is blown toward a side upper side of the passenger compartment, and a defroster opening through which air is blown toward a front windshield of the vehicle. The side face opening is provided between the center face opening and the defroster opening in an arrangement direction of the center face opening and the defroster opening within a width dimension of the center face opening in a direction perpendicular to the arrangement direction. Thus, a dimension of the air conditioning case in the direction perpendicular to the arrangement direction becomes smaller, while operation force of a door for opening and closing the center face opening is reduced.

20 Claims, 15 Drawing Sheets

FIG. 15

| AIR OUTLET MODE | AIR AMOUNT RATIO (%) FROM AIR OUTLETS | | | |
|---|---|---|---|---|
| | CENTER FACE | SIDE FACE | FOOT | DEFROSTER |
| FACE MODE | 55 | 45 | 0 | 0 |
| BI-LEVEL MODE | 30 | 30 | 40 | 0 |
| FOOT MODE | 0 | 35 | 55 | 10 |
| FOOT/DEFROSTER MODE | 0 | 30 | 35 | 35 |
| DEFROSTER MODE | 0 | 30 | 0 | 70 |

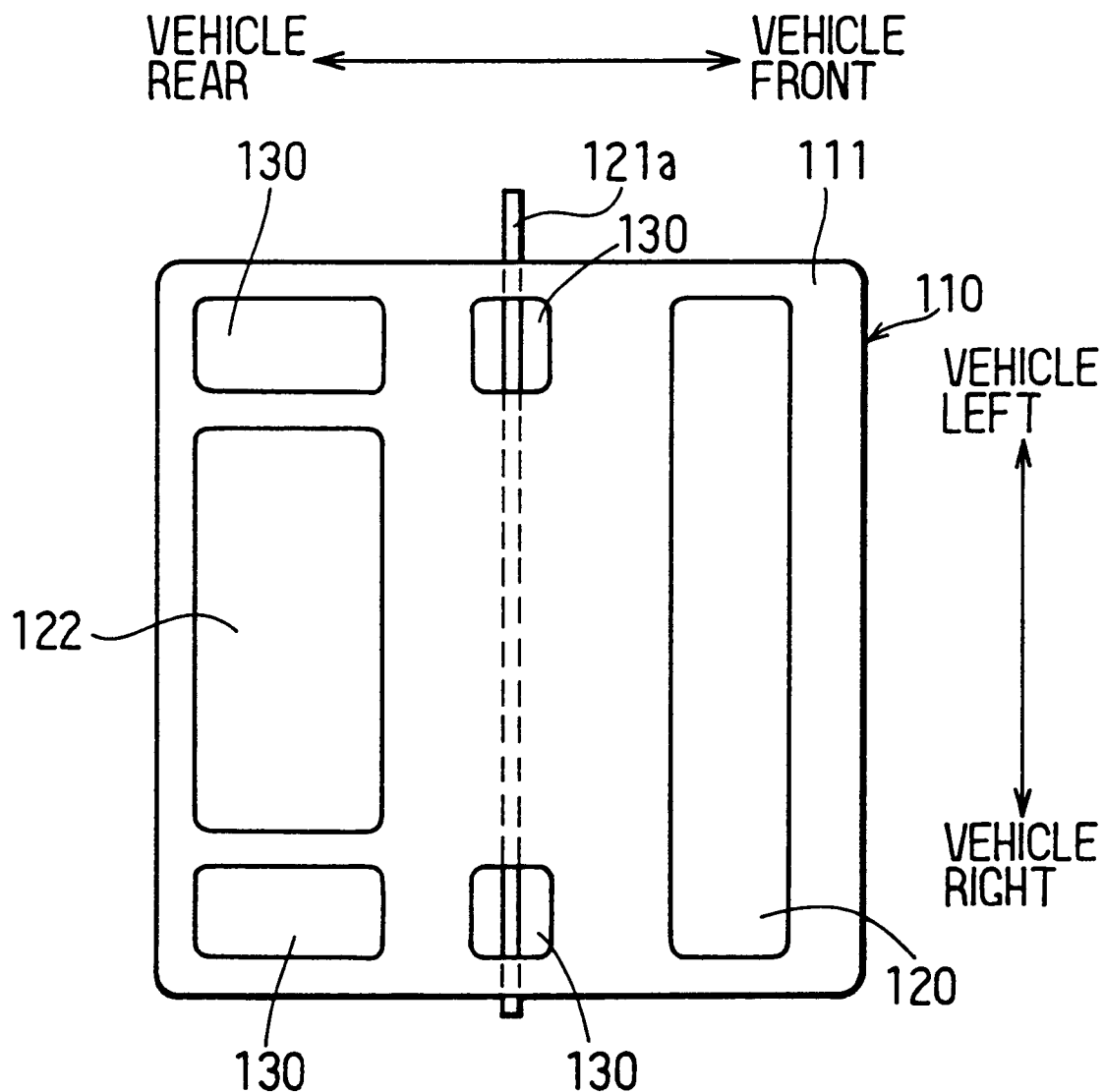

VEHICLE AIR CONDITIONER WITH SIDE FACE OPENING

CROSS-REFERENCE TO RELATED APPLICATION

This application is related to and claims priority from Japanese Patent Applications No. Hei. 11-295139 filed on Oct. 18, 1999, No. Hei. 11-364895 filed on Dec. 22, 1999, and No. 2000-251406 filed on Aug. 22, 2000, the contents of which are hereby incorporated by reference.

BACKGROUND OF THE INVENTION

1. Field of the Invention

The present invention generally relates to a vehicle air conditioner having side face air outlets provided at both right and left side ends of an instrument panel within a passenger compartment, and more particularly relates to an arrangement structure of air openings in an air conditioning case of the vehicle air conditioner.

2. Description of Related Art

In a conventional vehicle air conditioner described in JP-A-10-166838, as shown in FIG. 19, an air conditioning case 111 of an air conditioning unit 110 has a defroster opening 120 provided at a vehicle front side of a rotation shaft 120a of a defroster door, a center face opening 122 provided at a vehicle rear side of the rotation shaft 120a, and side face openings 130 provided on both right and left sides of the center face opening 122. The side face openings 130 are positioned outside a width dimension of the center face opening 122 in a vehicle right-left direction. Accordingly, a dimension of the air conditioning case 110 in the vehicle right-left direction is increased. On the other hand, when the center face opening 122 is enlarged for increasing an opening area of the center face opening 122 in an arrangement direction of the defroster opening 120 and the center face opening 122, it is necessary to increase a dimension of a foot/face switching door for opening and closing the center face opening 122, and operation force of the foot/face switching door becomes larger.

SUMMARY OF THE INVENTION

In view of the foregoing problems, it is an object of the present invention to provide a vehicle air conditioner which can reduce a dimension of an air conditioning unit in a direction perpendicular to an arrangement direction of a center face opening and a defroster opening, while without increasing operation force of a door for opening and closing the center face opening.

According to the present invention, in a vehicle air conditioner, an air conditioning case for defining an air passage through which air is blown toward a passenger compartment has a center face opening through which air is blown toward a center upper side of the passenger compartment in a vehicle right-left direction, a side face opening through which air is blown toward a side upper side of the passenger compartment in the vehicle right-left direction or a side windshield of the vehicle, and an air opening provided separately from the center face opening and the side face opening. A mode switching unit for selectively opening and closing the center face opening and the air opening is disposed at a downstream air side of a temperature adjustment unit for controlling temperature of air blown into the passenger compartment. In the vehicle air conditioner, at least a part of the side face opening is positioned within a width dimension of the center face opening in a direction perpendicular to an arrangement direction of the center face opening and the air opening. Accordingly, a dimension of the air conditioning case in the direction perpendicular to the arrangement direction becomes smaller without increasing a dimension of the air conditioning case in the arrangement direction. Therefore, operation force of the mode switching unit for opening and closing the center face opening can be reduced.

Preferably, the side face opening is provided between the center face opening and the air opening in the arrangement direction of the center face opening and the air opening. Therefore, the dimension of the air conditioning case in the arrangement direction can be reduced, and the dimension of the mode switching door in the arrangement direction can be also reduced. As a result, the operation force of the mode switching door can be further reduced.

Further, the mode switching unit is a door having a rotation shaft rotatably held in the air conditioning case and a plate member disposed in the rotation shaft to be operated by the rotation shaft, the side face opening is provided at least at one side of the center face opening and the air opening relative to the rotation shaft, and the plate member has an air passage part communicating with the side face opening. Therefore, during any one air outlet mode, conditioned air can be blown toward the side face opening.

Preferably, the side face opening includes a first side face opening part and a second side face opening part provided separately from the first side face opening part in the direction perpendicular to the arrangement direction. Further, center face opening and the air opening includes a first opening part having an air flow resistance smaller than a predetermined value, the air opening includes a second opening part having an air flow resistance larger than the predetermined value. During a first air outlet mode where the first opening part is closed and the second opening part is opened, the first side face opening part is opened and the second side face opening part is closed. On the other hand, during a second air outlet mode where the first opening part is opened and the second opening part is closed, both the first side face opening part and the second side face opening part are opened. During the second air outlet mode, because the first opening part having a small air flow resistance is opened and a second opening part having a large air flow resistance is closed, air readily flows into the first opening part. However, in the present invention, during the second air outlet mode, both the first and second side face opening parts are opened. Thus, it can prevent an air amount blown from the side face opening from being greatly different from each other between the first air outlet mode and the second air outlet mode.

BRIEF DESCRIPTION OF THE DRAWINGS

Additional objects and advantages of the present invention will be more readily apparent from the following detailed description of preferred embodiments when taken together with the accompanying drawings, in which:

FIG. 15 is a view showing an air amount ratio blown from air outlets during each air outlet mode, according to the fourth embodiment;

FIG. 19 is a top view showing a conventional air conditioning unit.

DETAILED DESCRIPTION OF THE PRESENTLY PREFERRED EMBODIMENTS

Figure 1:
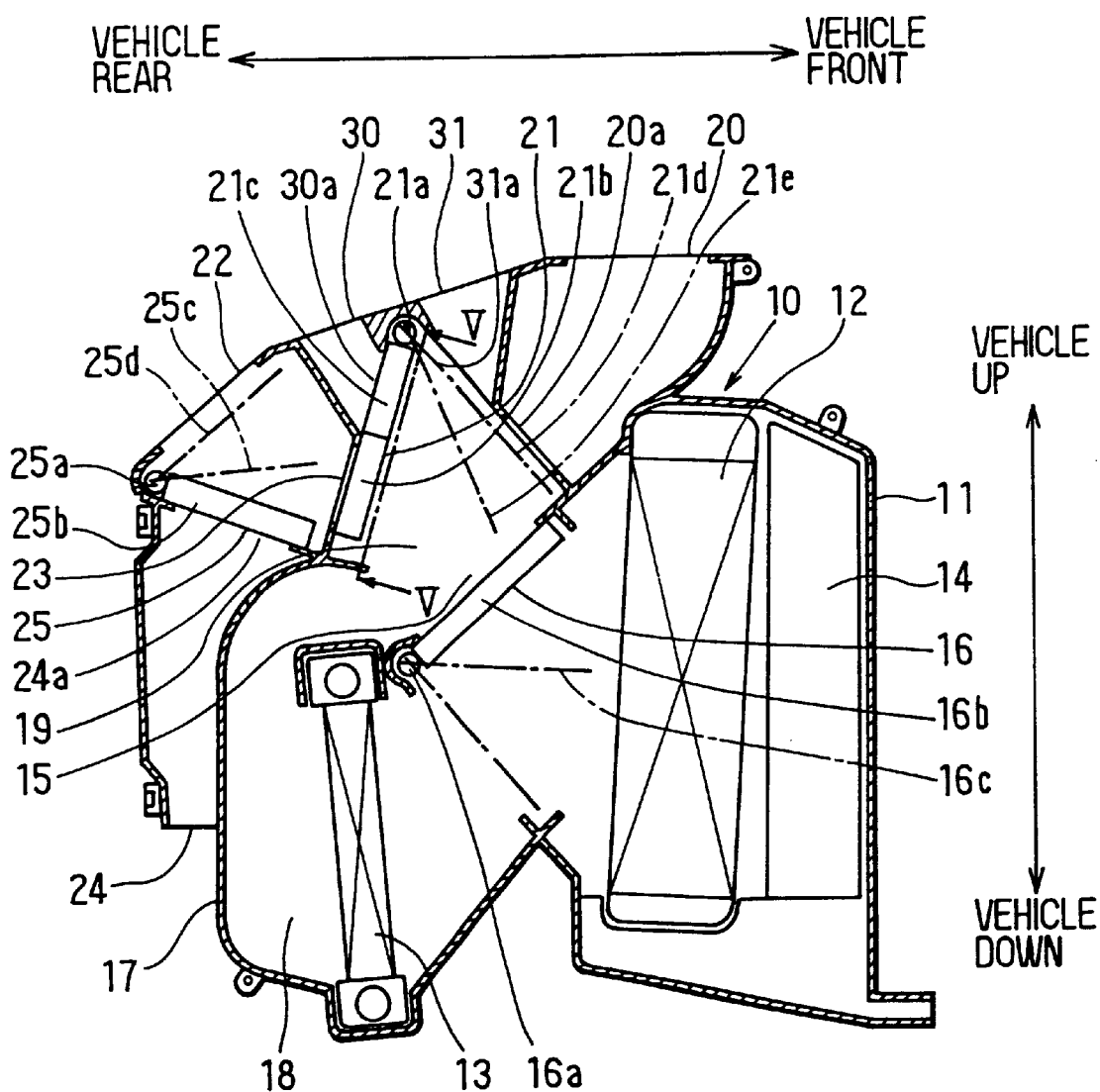
FIG. 1 is a schematic sectional view of an air conditioning unit during a defroster mode, according to a first preferred embodiment of the present invention.

Preferred embodiments of the present invention will be described hereinafter with reference to the accompanying drawings.

A first preferred embodiment of the present invention will be now described with reference to FIGS. 1–6. A ventilation system of a vehicle air conditioner includes a blower unit (not shown) and an air conditioning unit 10 shown in FIG. 1. The air conditioning unit 10 is disposed in a passenger compartment under an instrument panel at an approximate center in a vehicle right-left direction. On the other hand, the blower unit is disposed in the passenger compartment under the instrument panel at a position shifted to a front-passenger's seat side from the air conditioning unit 10.

The blower unit includes an inside/outside air switching box for introducing and switching inside air (i.e., air inside the passenger compartment) and outside air (i.e., air outside the passenger compartment), and a blower for blowing air sucked through the inside/outside air switching box.

The air conditioning unit 10 has an air conditioning case 11 defining an air passage through which air blown by the blower unit flows into the passenger compartment. The air conditioning unit 10 further has an evaporator 12 of a refrigerant cycle and a heater core 13. Both the evaporator 12 and the heater core 13 are integrally disposed in the air conditioning case 11.

The air conditioning case 11 is made of resin which has an elasticity to some degrees and is superior in a strength, such as polypropylene. The air conditioning case 11 is composed of right and left division case portions each having a division surface in a vehicle up-down direction. The right and left division case portions are integrally connected by fastening means such as a metal spring clip and a screw, after the heat exchangers 12, 13 and components such as doors are accommodated therein, to construct the air conditioning unit 10.

The air conditioning unit 10 is disposed to correspond to the arrangement shown in FIG. 1, relative to a vehicle front-rear direction and the vehicle up-down direction. An air inlet 14 is provided at a most front side of the air conditioning case 11, so that air blown from the blower unit flows into the air conditioning unit 10 through the air inlet 14. Because the air inlet 14 is connected to an air outlet of the blower unit disposed at the front passenger's seat side, the air outlet 14 is opened in the air conditioning case 11 at the front passenger's seat side.

The evaporator 12 is disposed in the air conditioning case 11 at a position immediately after the air inlet 14. The evaporator 12 is disposed vertically in the air conditioning case 11 to be thinned in the vehicle front-rear direction and to entirely cross an air passage within the air conditioning case 11. Therefore, air from the air inlet 14 flows into a front surface of the evaporator 12, extending in the vehicle up-down direction.

The evaporator 12 is a cooling heat exchanger, in which an evaporation latent heat of refrigerant of the refrigerant cycle is absorbed from air so that air passing therethrough is cooled. The evaporator 12 is a laminated type in which plural flat tubes, each of which is formed by connecting two metal thin plates made of aluminum or the like to each other, are laminated to sandwich a corrugated fin between the adjacent flat tubes, and then are integrally brazed.

The heater core 13 is disposed at a downstream air side (i.e., vehicle rear side) of the evaporator 12 to have a predetermined distance therebetween. The heater core 13 is disposed within the air conditioning case 11 at a lower side to be tilted slightly toward the vehicle rear side relative to the vehicle up-down direction by a predetermined angle. The heater core 13 is a heating heat exchanger in which hot water (engine-cooling water) flows so that air having passed through the evaporator 12 is heated using hot water as a heating source. The heater core 13 is disposed in the air conditioning case 11 to be thin in the vehicle front-rear direction, so that a longitudinal direction of the heater core 13 is positioned in the vehicle up-down direction. The heater core 13 is a laminated type in which plural flat tubes, each of which is formed by connecting two metal thin plates made of aluminum or the like to each other, are laminated to sandwich a corrugated fin between the adjacent flat tubes, and then are integrally brazed.

A cool air bypass passage 15 through which air having passed through the evaporator 12 bypasses the heater core 13 is provided within the air conditioning case 11 at an upper side from the heater core 13. A plate-like air mixing door 16 is disposed between the heater core 13 and the evaporator 12 so that a ratio between an amount of warm air heated in the heater core 13 and an amount of cool air bypassing the heater core 13 is adjusted.

The air mixing door 16 is rotated in the vehicle up-down direction around a rotation shaft 16a disposed in a horizontal direction. The air mixing door 16 is used as a temperature adjustment unit for adjusting temperature of air blown into the passenger compartment by adjusting the air amount ratio. The solid line position of the air mixing door 16 in FIG. 1 indicates the maximum heating position at which the cool air bypass passage 15 is fully closed and an air passage of the heater core 13 is fully opened. The rotation shaft 16a is rotatably held in the air conditioning case 11. One end of the rotation shaft 16a protrudes to an outside of the air conditioning case 11, and is connected to an actuator mechanism using a servomotor or a manual operation mechanism through a link mechanism. Therefore, a rotation position of the air mixing door 16 is adjusted by the actuator mechanism or the manual operation mechanism.

A wall portion 17 extending in the vehicle up-down direction is formed integrally with the air conditioning case 11 to have a predetermined distance between the wall portion 17 and the heater core 13. Therefore, a warm air passage 18 extending from an immediately downstream air side of the heater core 13 upwardly is defined by the wall portion 17. An air mixing portion 19 in which warm air from the warm air passage 18 and cool air from the cool air bypass passage 15 are mixed is provided at a downstream air side (upper side) of the warm air passage 18, upper than the heater core 13.

A defroster opening 20 is opened on an upper surface of the air conditioning case 11 at a position of a vehicle front side. The defroster opening 20 is provided so that conditioned air from the air mixing portion 19 flows into the defroster opening 20 through a communication path 20a. The defroster opening 20 is connected to a defroster air outlet through a defroster duct so that conditioned air is blown toward an inner surface of a front windshield from the defroster air outlet.

A communication port 23 communicating with the air mixing portion 19 is provided in the air conditioning case 11, and a center face opening 22 and a foot inlet 24a of a foot opening 24 are provided at a downstream air side of the communication path 23, so that air from the air mixing portion 19 flows toward the center face opening 22 and the foot inlet 24a of the foot opening 24 through the communication path 23. The center face opening 22 is connected to a center face air outlet provided on the instrument panel at an upper side of a center portion in the vehicle right-left direction, through a face duct, so that conditioned air is blown toward the head portion of a passenger in the passenger compartment from the center face air outlet. Further, the foot opening 24 is connected to a foot air outlet through a foot duct, so that conditioned air is blown toward the foot area of the passenger in the passenger compartment from the foot air outlet.

In the first embodiment of the present invention, the communication path 20a and the communication path 23 are selectively opened and closed by a defroster door 21. That is, the defroster opening 20 and the communication path 23 are opened and closed by the defroster door 21. The defroster door 21 is constructed by a rotation shaft 21a rotatably held in the air conditioning case 11 and a plate member 21b rotated by the rotation shaft 21a.

The center face opening 22 and the foot inlet 24a of the foot opening 24 are selectively opened and closed by a foot/face switching door 25. That is, the center face opening 22 and the foot opening 24 are opened and closed by the foot/face switching door 25. The foot/face switching door 25 is constructed by a rotation shaft 25a rotatably held in the air conditioning case 11 and a plate member 25b rotated by the rotation shaft 25a. The defroster door 21 and the foot/face switching door 25 are used as an air outlet mode switching door, and are operatively linked by a mode switching mechanism (e.g., actuator such as a servomotor) through a link mechanism.

Figure 2:
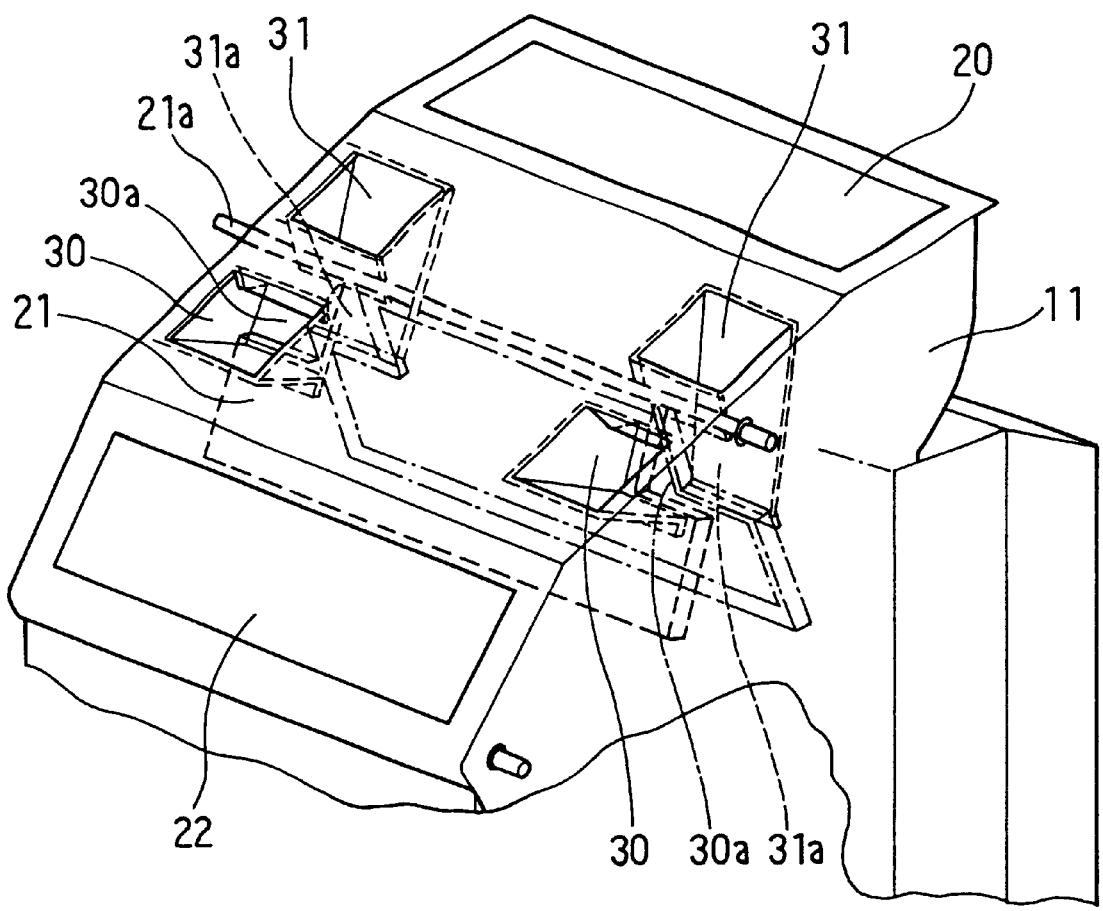
FIG. 2 is a perspective view showing a main part of the air conditioning unit during the defroster mode, according to the first embodiment.

As shown in FIG. 2, communication paths 30a, 31a, into which conditioned air from the air mixing portion 19 flows, are provided within the air conditioning case 11 on both sides of the rotation shaft 21a in the vehicle front-rear direction at positions proximate to both ends of the rotation shaft 21a. The communication paths 30a, 31a communicate with side face openings 30, 31, respectively.

The side face openings 30, 31 are connected to side face air outlets provided on the instrument panel at both right and left sides of the passenger compartment, through side face ducts, so that conditioned air is blown toward the head portion of a passenger at both right and left sides or blown toward inner surfaces of side windshields. An air-flow changing device manually operated is disposed in the side face air outlets. By adjusting a direction of air-flow plates of the air-flow changing device, air can be blown toward upper right and left sides of the passenger compartment or toward a side windshield.

Figure 3:
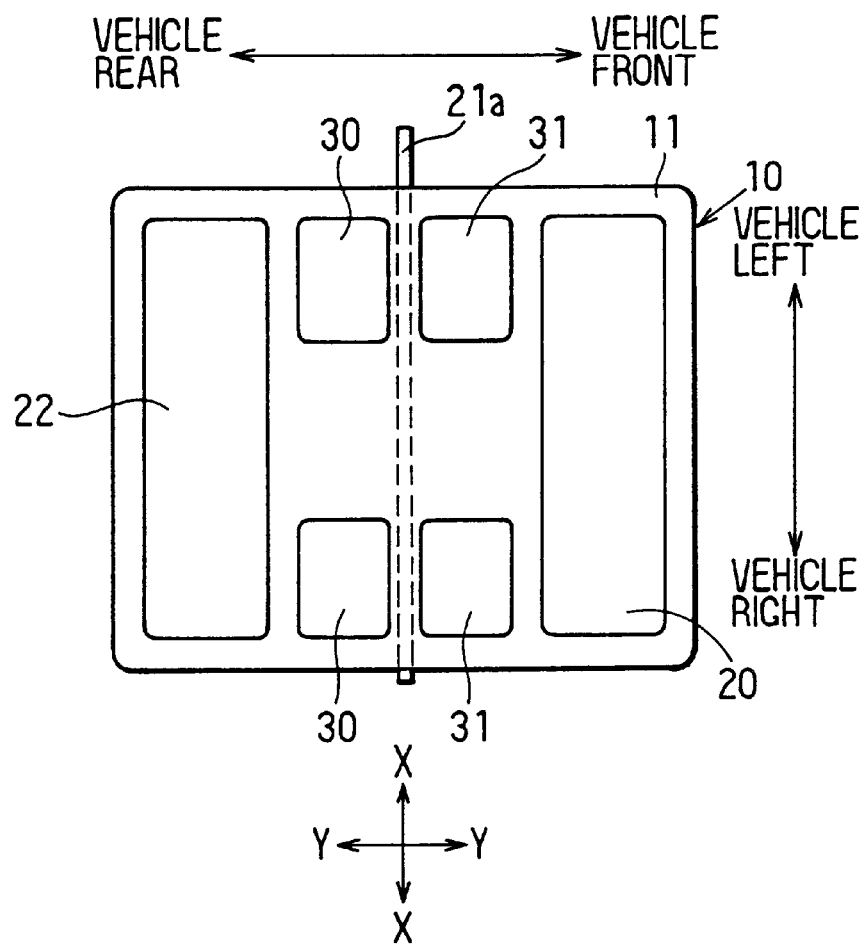
FIG. 3 is a top view of the air conditioning unit shown in FIG. 1.

As shown in FIG. 3, the side face openings 30, 31 communicating with the communication paths 30a, 31a are provided between the defroster opening 20 at a vehicle front side and the center face opening 22 at a vehicle rear side. In the first embodiment, both the side face openings 31 are provided at a vehicle front side of the rotation shaft 21a of the defroster door 21, and both the side face openings 30 are provided at a vehicle rear side of the rotation shaft 21a. Both the side face openings 30 are arranged in the X—X direction (vehicle right-left direction) to be positioned within a width dimension of the center face opening 22 in the X—X direction, and both the side face openings 31 are also arranged in the X—X direction (vehicle right-left direction) to be positioned within the width dimension of the center face opening 22 in the X—X direction.

Figure 4:
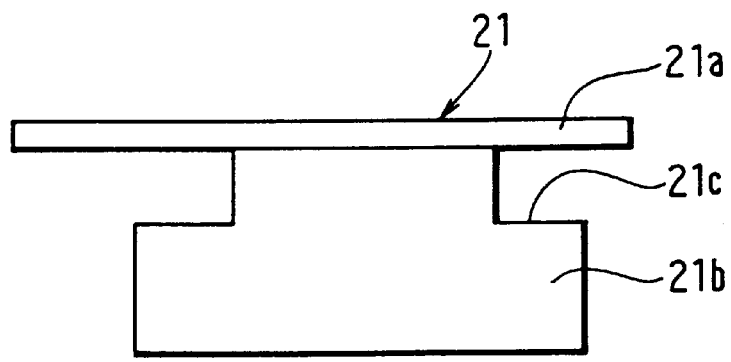
FIG. 4 is a front view of a defroster door according to the first embodiment.

As shown in FIG. 4, the plate member 21b has both recess portions 21c each of which is recessed at both end side of the rotation shaft 21a to form air passages. That is, the shape of the defroster door 21 is formed to always open all the side face openings 30, 31 at an any position of the defroster door 21.

As described above, the doors 16, 21, 25 have the rotation shafts 16a, 21a, 25a, and the plate members 16b, 21b, 25b integrated with the rotation shafts 16a, 21a, 25a, respectively. Each length dimension of the rotation shafts 16a, 21a, 25a is approximately equal. Each of the plate members 16b, 21b, 25b has a door base plate made of a resin or a metal, and an elastic seal member such as an urethane foam bonded on both surfaces of the door base plate.

Next, operation of the vehicle air conditioner according to the first embodiment will be now described. The vehicle air conditioner includes an electronic control unit into which operation signals from various operation members provided on an air-conditioning operation panel and sensor signals from various sensors are input. The electronic control unit outputs control signals to the doors 16, 21, 25 so that operation positions of the doors 16, 21, 25 are controlled.

FIG. 1 shows a state of the air conditioning unit 10 when a defroster mode is set. During the defroster mode, both the doors 21, 25 are operated, so that the defroster opening 20 is opened and the center face opening 22 and the foot opening 24 are closed. Therefore, air blown by the blower unit is mainly blown toward the front windshield through the defroster opening 20 to defrost the front windshield.

Figure 5:
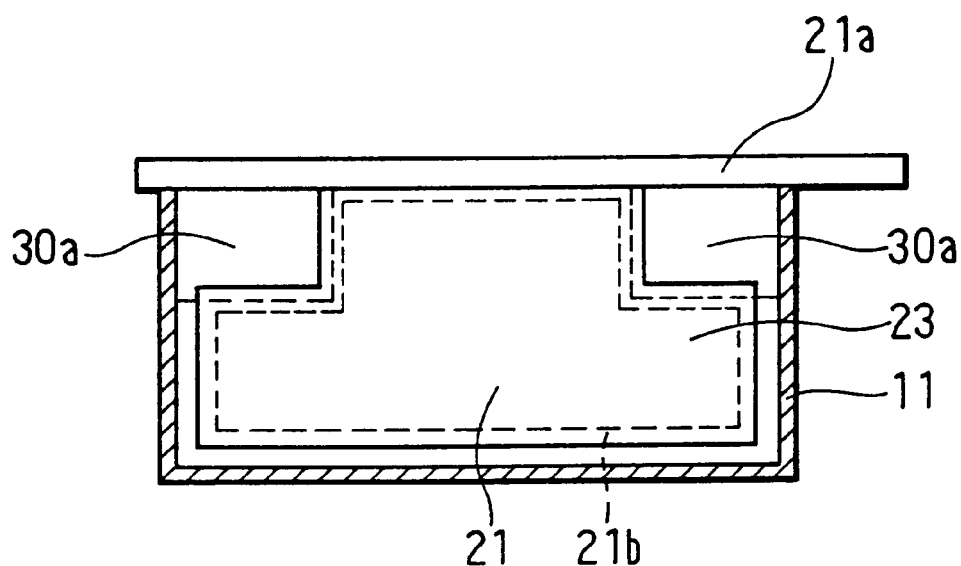
FIG. 5 is a cross-sectional view taken along line V—V in FIG. 1, showing a state where a communication path communicating with both a center face opening and a foot opening is closed by the defroster door.

During the defroster mode, as shown in FIG. 5, the communication path 23 is closed by the defroster door 21. However, the communication paths 31a of the side face openings 31 communicate with the air mixing portion 19, and the communication paths 30a of the side face openings 30 also communicate with the air mixing portion 19 through communication openings defined by the recess portions 21c of the defroster door 21. Thus, a part of air blown by the blower unit flows into the side face openings 30, 31 from the air mixing portion 19 through the communication paths 30a, 31a. Thereafter, air from the side face openings 30, 31 is introduced into the side face air outlets, and is blown toward the side windshields and side upper side of the passenger compartment from the side face air outlets.

In the defroster mode shown in FIG. 1, the air mixing door 16 is operated to the maximum heating position. By rotating the air mixing door 16 from the maximum heating position toward the maximum cooling position, the temperature of air blown into the passenger compartment can be arbitrarily adjusted.

Figure 6:
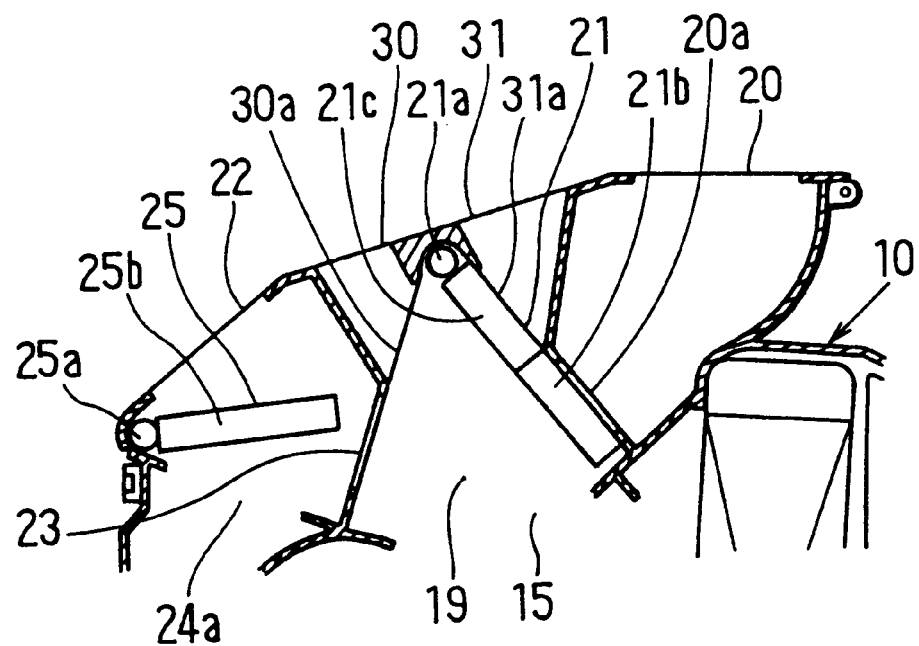
FIG. 6 is a sectional view showing a main part of the air conditioning unit during a bi-level mode, according to the first embodiment.

When a bi-level mode is set as shown in FIG. 6, the defroster door 21 is operated at the solid line position in FIG. 6 (i.e., the chain line position 21d in FIG. 1), and the communication path 20a of the defroster opening 20 is closed and the communication path 23 is fully opened. At this time, the communication paths 30a of the side face openings 30 communicate with the air mixing portion 19, and the communication paths 31a of the side face openings 31 also communicate with the air mixing portion 19 through the communication openings defined by the recess portions 21c of the defroster door 21.

During the bi-level mode, the foot/face switching door 25 is operated at a middle position (i.e., the chain line position 25c in FIG. 1) between the center face opening 22 and the foot inlet 24a of the foot opening 24, so that both the center face opening 22 and the foot inlet 24a of the foot opening 24 are opened. Further, the air mixing door 16 is generally operated at a position (e.g., the middle position 16c of FIG. 1) between the maximum cooling position and the maximum heating position.

In this state, air blown by the blower unit flows into the air conditioning unit 10 from the air inlet 14, and is cooled in the evaporator 12 while passing through the evaporator 12. A part of cool air from the evaporator 12 flows through the cool air bypass passage 15, and the other part thereof is introduced into the heater core 13 to be heated in the heater core 13. The ratio between air flowing through the cool air bypass passage 15 and air flowing through the heater core 13 is adjusted by the air mixing door 16.

Warm air heated in the heater core 13 flows toward the air mixing portion 19 after passing through the warm air passage 18 upwardly. In the air mixing portion 19, cool air from the cool air bypass passage 15 and warm air from the warm air passage 18 are mixed. However, the air passages of the air conditioning unit 10 are provided so that cool air mainly flows toward the face openings 22, 30, 31 and warm air mainly flows toward the foot opening 24. Accordingly, temperature of air blown toward the face openings 22, 30, 31 becomes lower than temperature of air blown toward the foot opening 24. As a result, during the bi-level mode, temperature of air blown toward the head portion of a passenger in the passenger compartment can be made lower than temperature of air blown toward the foot portion of the passenger in the passenger compartment, and a pleasant temperature distribution of "cool head and warm foot" can be obtained.

When a face mode is set, the defroster door 21 is operated at the chain line position 21d in FIG. 1 so that the defroster opening 20 is closed and the communication path 23 is fully opened. Further, the foot/face switching door 25 is operated to the solid line position in FIG. 1 so that the foot inlet 24a of the foot opening 24 is closed and the center face opening 22 is opened. During the face mode, the communication paths 30a of the side face openings 30 communicate with the air mixing portion 19, and the communication paths 31a of the side face openings 31 also communicate with the air mixing portion 19 through the communication openings defined by the recess portions 21c of the defroster door 21, similarly to the bi-level mode. Accordingly, during the face mode, air blown by the blower unit flows toward the head portion of the passenger from the center face air outlet through the center face opening 22, and also flows toward the right and left upper sides of the passenger compartment from the side face air outlets through the side face openings 30, 31.

Next, when a foot mode is set, the defroster door 21 is operated at the chain line position 21e in FIG. 1 to slightly open the communication path 20a of the defroster opening 20 and to greatly open the communication path 23. Further, the foot/face switching door 25 is operated to the chain line position 25d in FIG. 1 to close the center face opening 22. Accordingly, both the defroster opening 20 and the foot inlet 24a of the foot opening 24 are opened. In addition, the communication paths 30a, 31a of the side face openings 30, 31 communicate with the air mixing portion 19. Thus, during the foot mode, warm air is blown toward the foot area of the passenger to heat the passenger compartment, and defrosting of the windshield is also performed.

When a foot/defroster mode is set from the foot mode, the defroster door 21 is rotated to the clockwise direction by a predetermined angle, so that the opening degree of the communication path 20a of the defroster opening 20 becomes larger and the opening degree of the communication path 23 becomes smaller, as compared with the foot mode. During the foot/defroster mode, an amount of air blown into the defroster opening 20 and the side face openings 30, 31 is set to be approximately equal to an amount of air blown into the foot opening 24.

According to the first embodiment, the dimension of the air conditioning case 11 for defining the center face opening 22, the defroster opening 20 and the side face openings 30, 31 in the X—X direction can be reduced, without increasing the operation force of the foot/face switching door 25 for opening and closing the center face opening 22. Further, during all air outlet modes, air is blown from the side face air outlets. In the first embodiment, the X—X direction indicated in FIG. 3 is approximately perpendicular to an arrangement direction of the center face opening 22 and the defroster opening 20.

According to the first embodiment, the side face openings 30, 31 are provided within the width dimension of the center face opening 22 in the X—X direction. Therefore, the dimension of the air conditioning case 11 in the X—X direction can be further reduced.

A second preferred embodiment of the present invention will be now described with reference to FIGS. 7 and 8. In the above-described first embodiment, the side face openings 30 are provided at one side (i.e., the side of the center face opening 22) of the rotation shaft 21a, and the side face openings 31 are provided at the other side (i.e., the side of the defroster opening 20) of the rotation shaft 21a.

Figure 7:
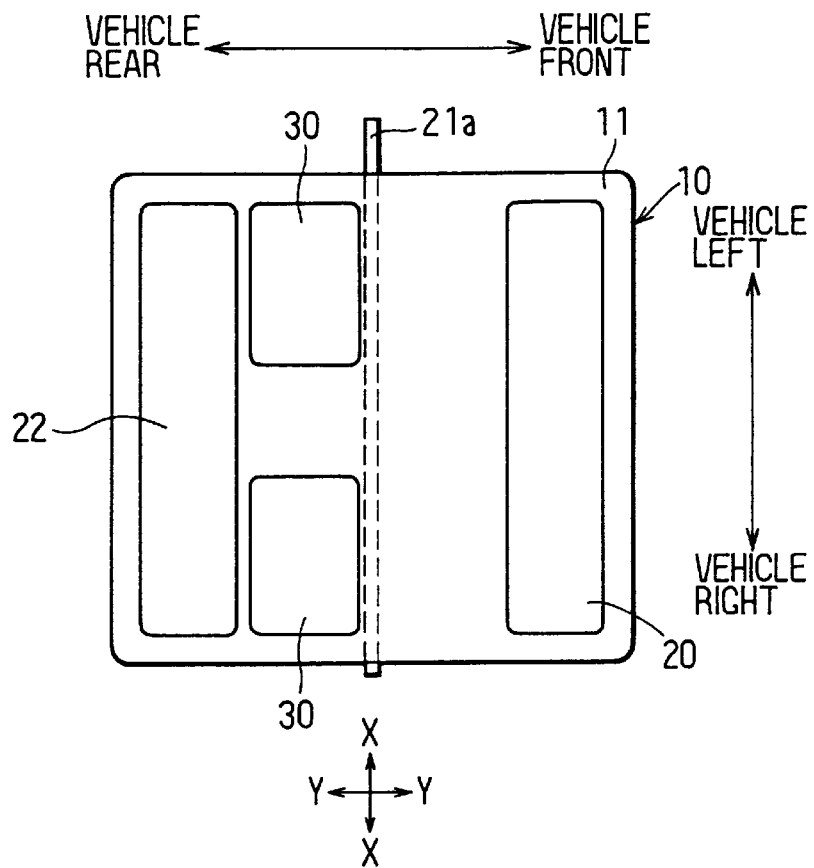
FIG. 7 is a top view showing an air conditioning unit according to a second preferred embodiment of the present invention.

In the second embodiment, as shown in FIG. 7, only both the side face openings 30 are provided within the width dimension of the center face opening 22 to be arranged in the X—X direction at the one side relative to the rotation shaft 21a. Therefore, in the second embodiment, the side face openings 31 and the communication paths 31a communicating with the side face openings 31 described in the first embodiment are not necessary. In the second embodiment, components similar to those of the above-described first embodiment are indicated with the same reference numbers, and the detail explanation thereof is omitted.

Figure 8:
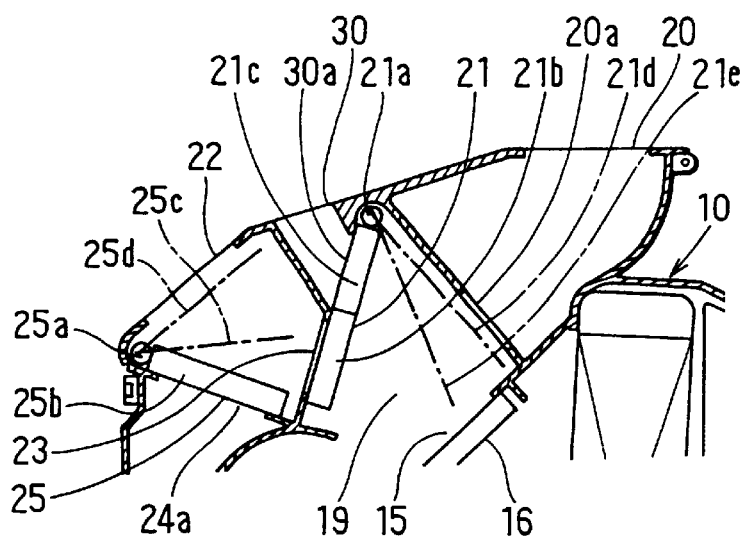
FIG. 8 is a sectional view showing a main part of the air conditioning unit during a defroster mode, according to the second embodiment.

FIG. 8 shows an air conditioning unit 10 during the defroster mode, according to the second embodiment. During the defroster mode, the defroster door 21 opens the communication path 20a of the defroster opening 20 and closes the communication path 23 communicating with the center face opening 22 and the foot opening 24. At this time, the communication paths 30a of the side face openings 30 communicate with the air mixing portion 19 through communication openings defined by the recess portions 21c of the defroster door 21. Therefore, a part of air from the air mixing portion 19 flows into the side face openings 30 through the communication paths 30a, and is blown toward the side windshields of the vehicle from the side face air outlets.

When the bi-level mode or the face mode is set, the defroster door 21 is operated to the chain line position 21d in FIG. 8 so that the communication path 20a communicating with the defroster opening 20 is closed. In this case, because the communication paths 30a of the side face openings 30 directly communicate with the air mixing portion 19, a part of air from the air mixing portion 19 flows into the communication paths 30a of the side face openings 30, and is blown from the side face air outlets.

When the foot mode is set, the defroster door 21 is operated at the chain line position 21e in FIG. 8 so that the communication path 20a of the defroster opening 20 is slightly opened and the communication path 23 is greatly opened. In this case, because the communication paths 30a of the side face openings 30 communicate with the air mixing portion 19, a part of air from the air mixing portion 19 flows into the communication paths 30a of the side face openings 30, and is blown from the side face air outlets.

Further, when the foot/defroster mode is set from the foot mode, the defroster door 21 is rotated in the clockwise direction from the position of the foot mode by a predetermined angle, so that the opening degree of the communication path 20a of the defroster opening 20 becomes larger, and the opening degree of the communication path 23 becomes smaller. Even in this case, because the communication paths 30a of the side face openings 30 communicate with the air mixing portion 19, a part of air from the air mixing portion 19 flows into the communication paths 30a and the side face openings 30, and is blown from the side face air outlets.

Thus, in the second embodiment, the effect similar to that of the above-described first embodiment can be obtained.

Figure 9:
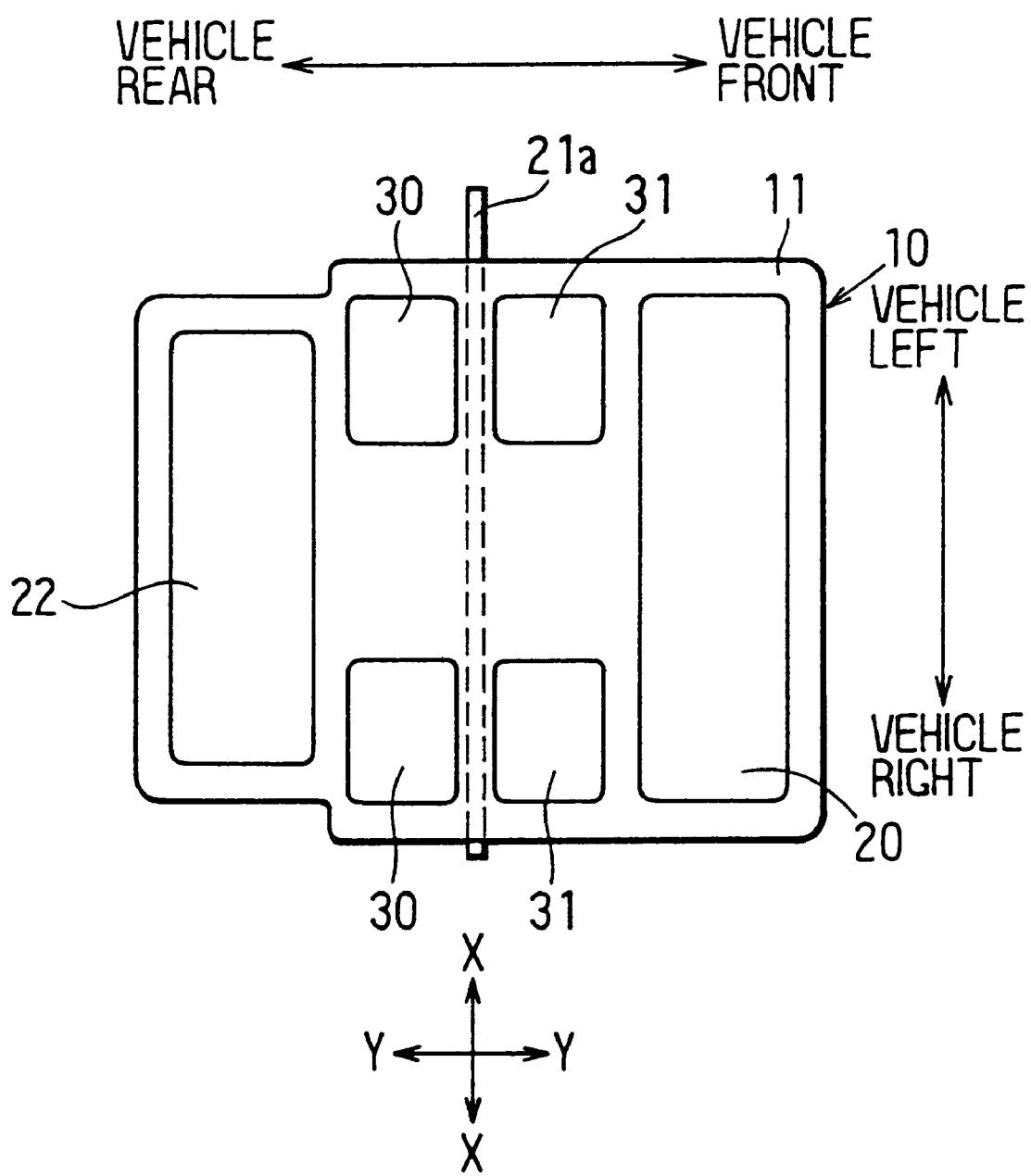
FIG. 9 is a top view showing an air conditioning unit according to a third preferred embodiment of the present invention.

A third preferred embodiment of the present invention will be now described with reference to 9. As shown in FIG. 9, in the X—X direction approximately perpendicular to the arrangement direction of the center face opening 22 and the defroster opening 20, a first part 30a, 31a of the side face openings 30, 31, respectively, is provided within the width range of the side face opening 22. The other parts of FIG. 9 are similar to those of the above-described first embodiment.

As shown in FIG. 9, the side face openings 30, 31 are provided between the center face opening 22 and the defroster opening 20 in the arrangement direction (i.e., Y—Y direction) of the center face opening 22 and the defroster opening 20. Further, in the X—X direction approximately perpendicular to the arrangement direction of the center face opening 22 and the defroster opening 20, a first part 30a, 31a of each side face opening 30, 31 is provided within the width dimension of the center face opening 22. Each side face opening 30, 31 is provided in such a manner than an area of the first part 30a, 31a of each side face opening 30, 31 positioned within the width dimension of the center face opening 22 is larger than an area of the other or second part 30b, 31b of each side face opening 30, 31 positioned outside the width dimension of the center face opening 22, in the X—X direction.

Thus, the dimension of the air conditioning case 11 for defining the side face openings 30, 31 and the center face opening 22 in the X—X direction can be reduced as compared with a case where all side face openings are positioned outside the center face opening 22. Thus, the effect similar to that of the above-described first embodiment can be obtained.

Figure 10:
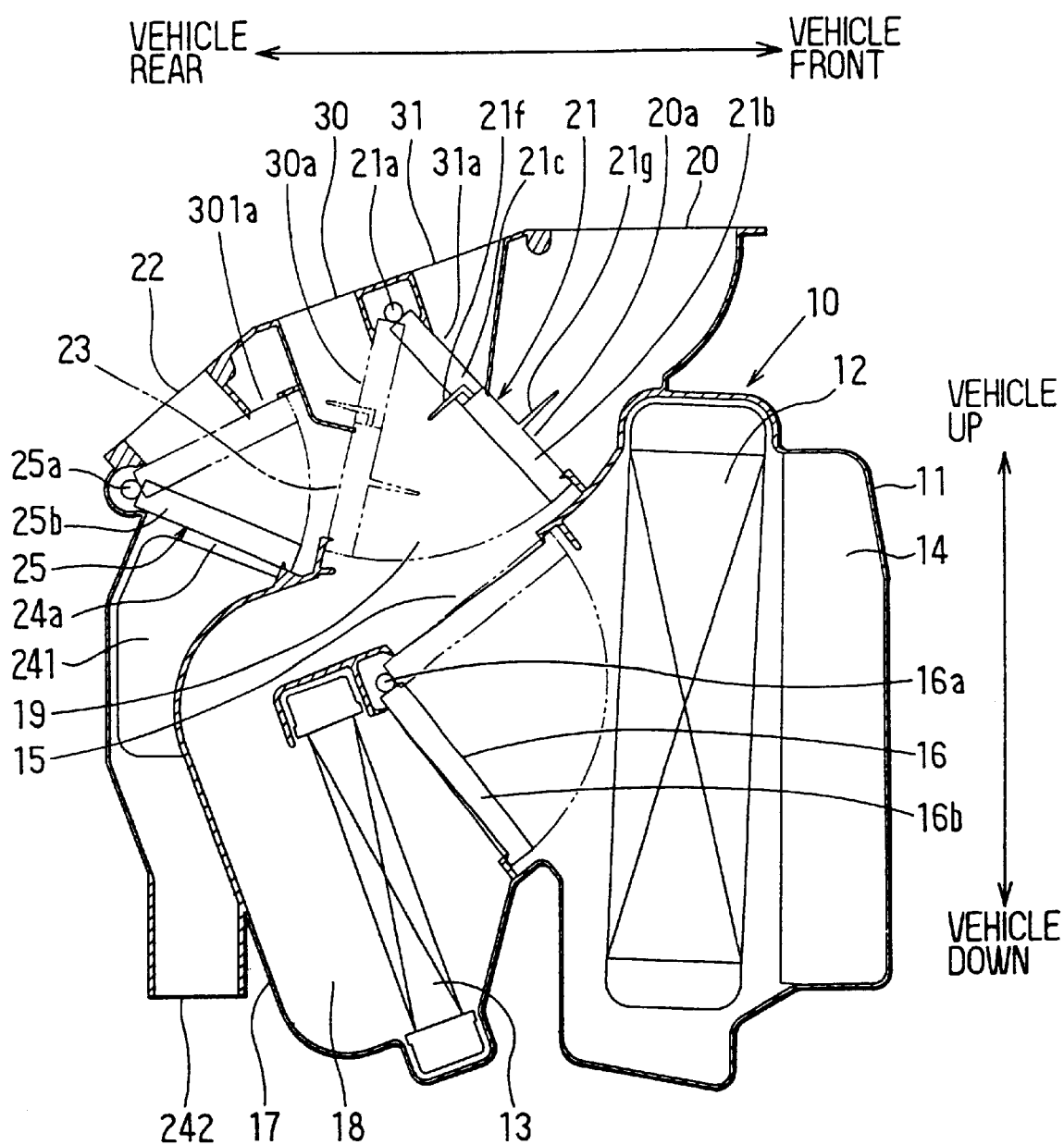
FIG. 10 is a schematic sectional view of an air conditioning unit during a face mode, according to a fourth preferred embodiment of the present invention.
Figure 11:
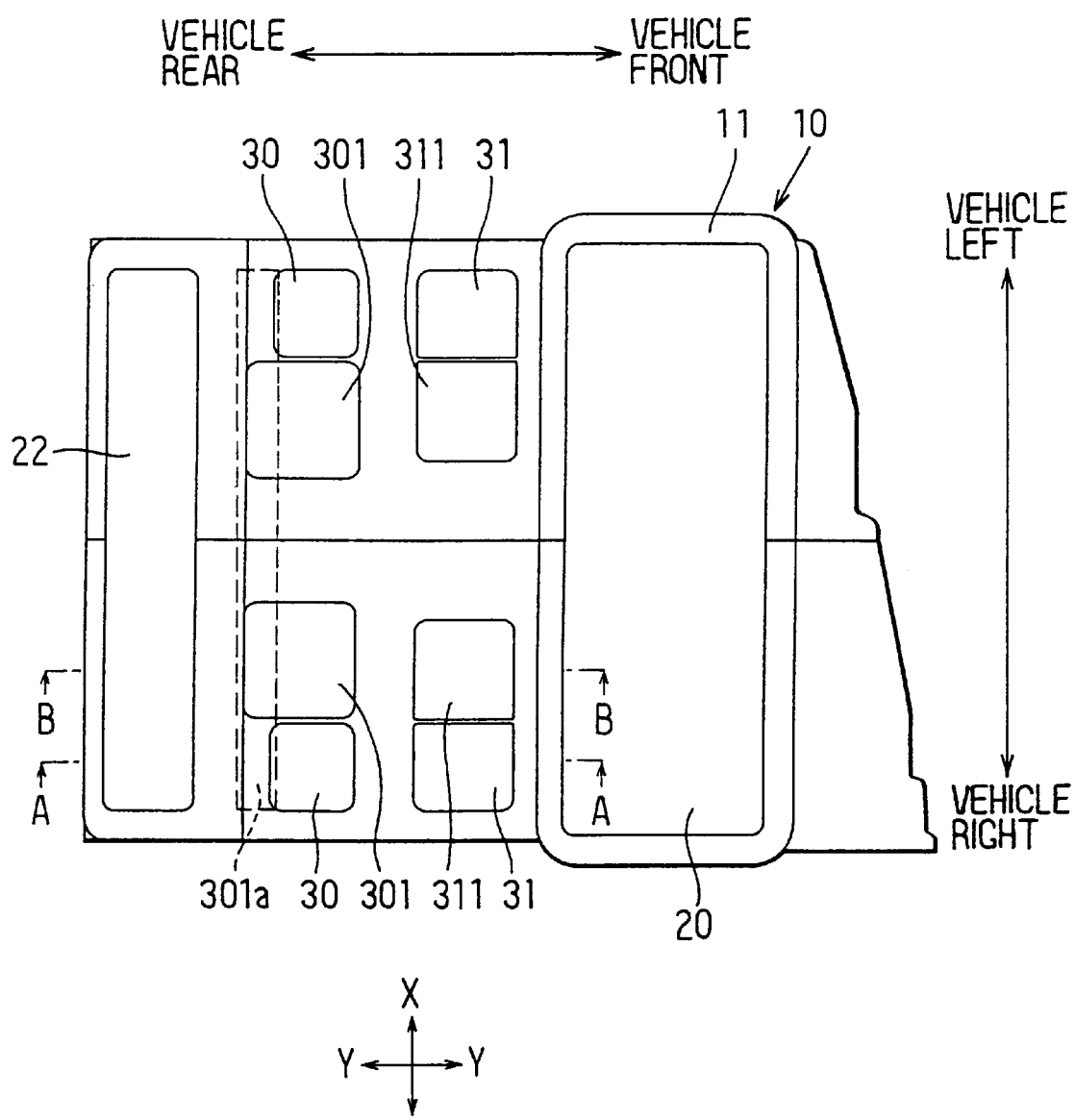
FIG. 11 is a top view of the air conditioning unit according to the fourth embodiment.
Figure 12A:
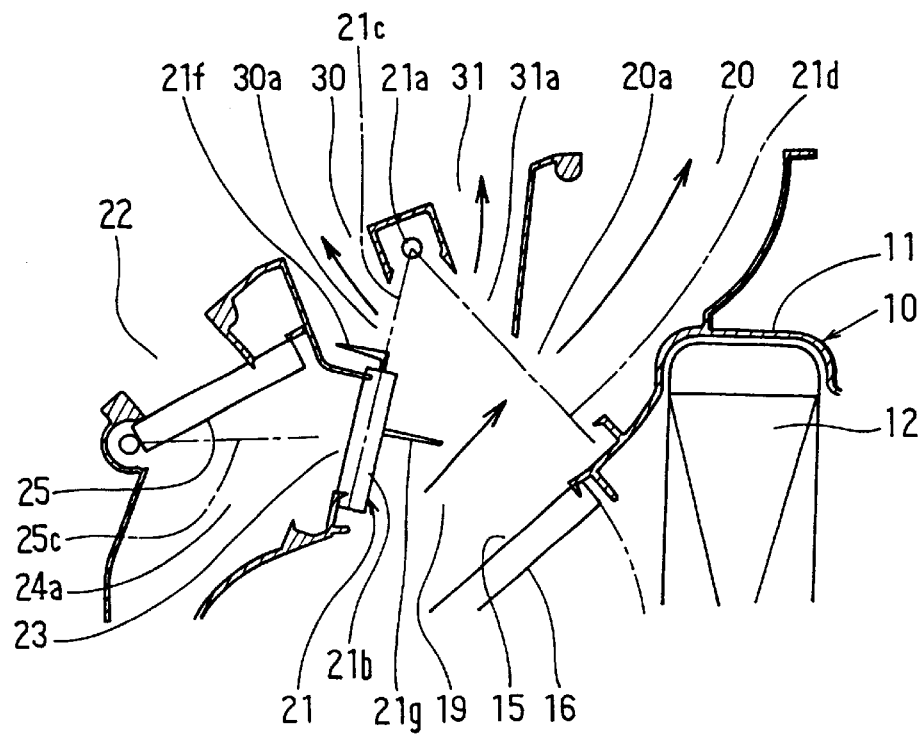
FIG. 12A is a cross-sectional view taken along line A—A in FIG. 11.
Figure 12B:
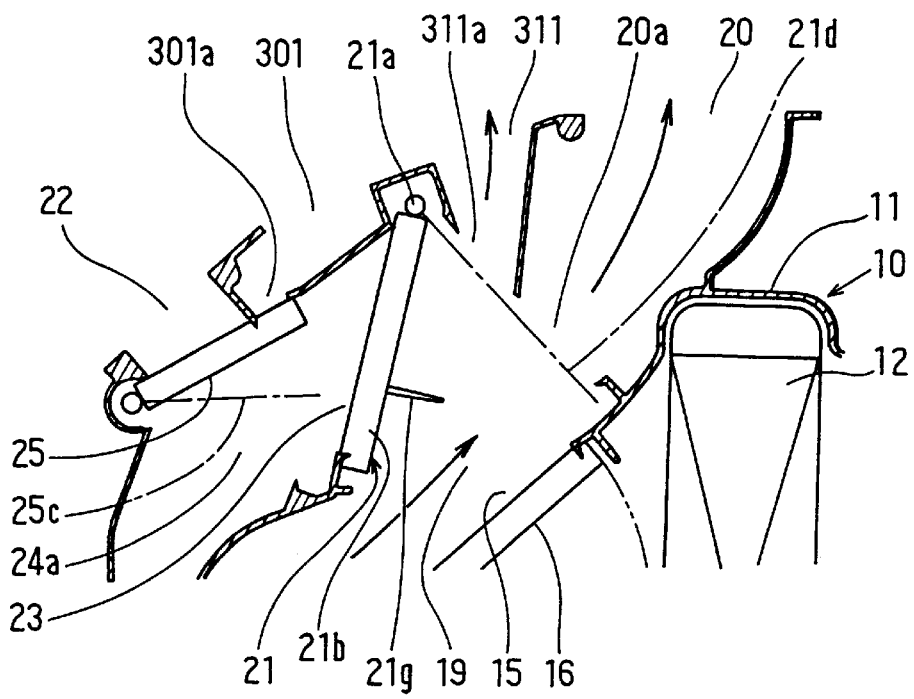
FIG. 12B is a cross-sectional view taken along line B—B in FIG. 11, during a defroster mode.
Figure 13A:
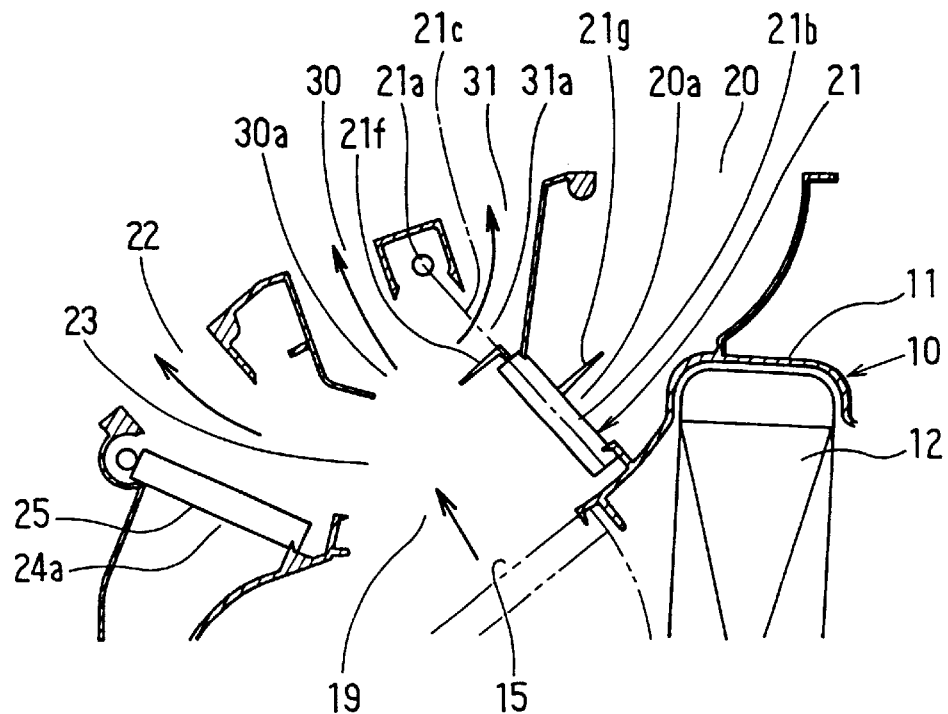
FIG. 13A is a cross-sectional view taken along line A—A in FIG. 11.
Figure 13B:
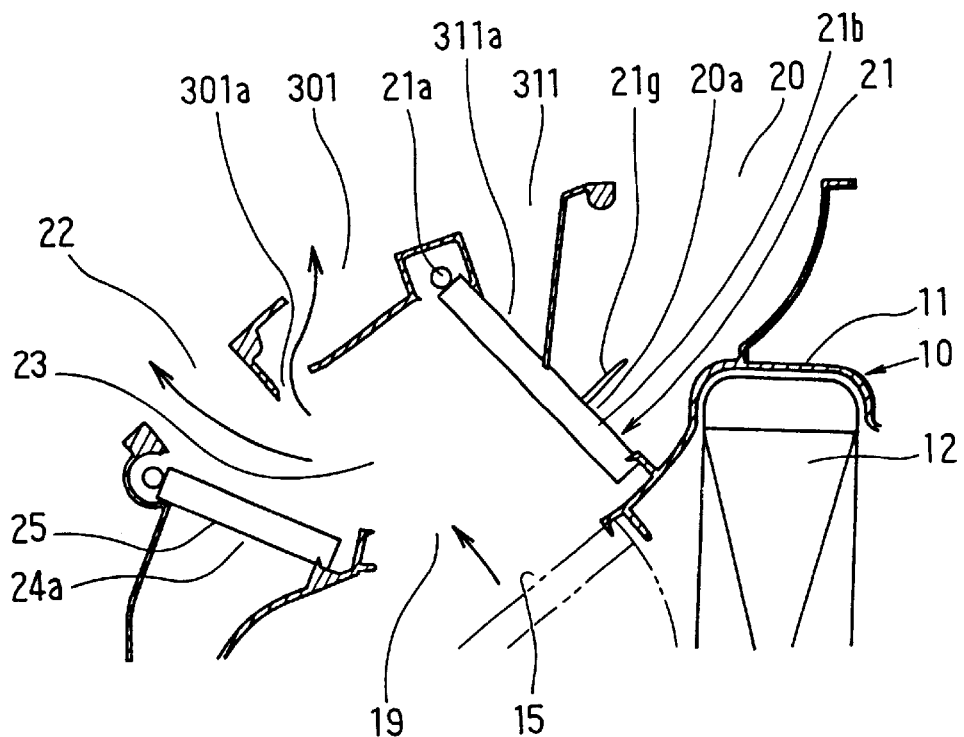
FIG. 13B is a cross-sectional view taken along line B—B in FIG. 11, during the face mode.
Figure 14A:
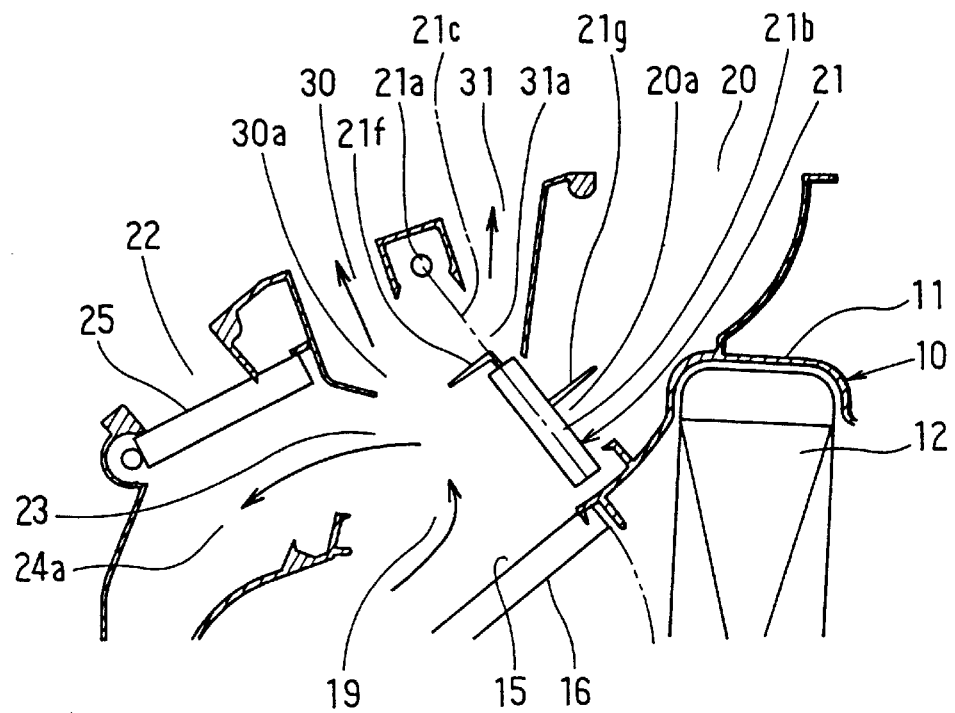
FIG. 14A is a cross-sectional view taken along line AA in FIG. 11.
Figure 14B:
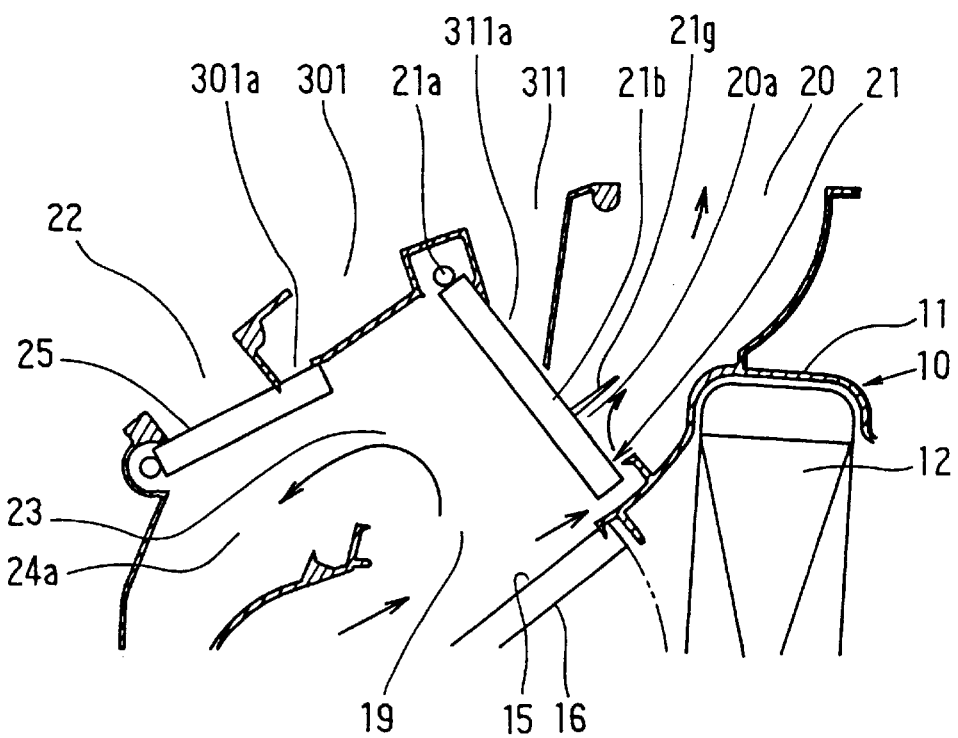
FIG. 14B is a cross-sectional view taken along line B—B in FIG. 11, during a foot mode.

A fourth preferred embodiment of the present invention will be now described with reference to FIGS. 10–15. In the fourth embodiment, as shown in FIG. 11, side face openings 301, 311 which are opened or closed in accordance with a set air outlet mode are further provided in addition to the side face openings 30, 31 described in the first embodiment. In the fourth embodiment, components similar to those of the first embodiment are indicated with the same reference numbers, and the detail explanation thereof is omitted. FIG. 10 is a schematic sectional view showing an air conditioning unit 10 according to the fourth embodiment. FIGS. 12A, 12B are cross-sectional views taken along lines A—A and B—B in FIG. 11, respectively, during a defroster mode. FIGS. 13A, 13B are cross-sectional views taken along lines A—A and B—B in FIG. 11, respectively, during a face mode. Further, FIGS. 14A, 14B are cross-sectional views taken along lines A—A and B—B in FIG. 11, respectively, during a foot mode.

The defroster opening 20 is opened on the upper wall surface of the air conditioning case 11 at a front side position. The defroster opening 20 is connected to the defroster air outlet through the defroster duct, so that conditioned air is blown toward the inner surface of the front windshield from the defroster air outlet. Because a distance of the defroster duct from the defroster opening 20 to the defroster air outlet is short, a flow resistance of air passing through the defroster opening 20 becomes smaller. As shown in FIG. 12B, each side face opening 311 is provided at a vehicle rear side of the defroster opening 20 adjacent to the defroster opening 20, so that conditioned air from the air mixing portion 19 flows into each communication path 311a of both the side face openings 311. In the fourth embodiment, as shown in FIG. 11, both the side face openings 311 are provided inside the side face openings 31 in the X—X direction.

As shown in FIG. 10, in the fourth embodiment, the center face opening 22, the foot inlet 24a and a communication path 301a are provided at a downstream air side of the communication path 23. At a downstream air side of the communication path 24a, a front foot opening 241 and a rear foot opening 242 are provided. The center face opening 22 is connected to a center face air outlet provided on an upper side at a center position of the instrument panel in the vehicle right-left direction, through a center face duct, so that conditioned air is blown toward the head portion of the passenger in the passenger compartment from the center face air outlet. Because a distance of the center face duct from the center face opening 22 to the center face air outlet is short, a flow resistance of air passing through the center face opening 22 is small.

As shown in FIG. 11, side face openings 301 are provided inside the side face openings 30 in the X—X direction. In the present invention, the side face openings 30, 31 are a first side face opening, and the side face openings 301, 311 are a second side face opening provided inside the first side face opening in the X—X direction. As shown in FIG. 12B, the side face openings 301 are provided at a downstream air side of a communication path 301a.

The front foot opening 241 is connected to a front foot air outlet through a front foot duct so that conditioned air is blown toward the foot area of a front passenger seated on a front seat in the passenger compartment from the front foot air outlet. The rear foot opening 242 is connected to a rear foot air outlet through a rear foot duct so that conditioned air is blown toward the foot area of a rear passenger seated on a rear seat in the passenger compartment from the rear foot air outlet. Both the front and rear ducts are disposed to have a sufficient air-flowing direction, but are difficult to have a sufficient air opening area. Therefore, the flow resistance of air passing through the foot openings 241, 242 becomes larger.

The communication path 23 and both the communication paths 20a and 311a are selectively opened and closed by the defroster door 21. That is, the communication path 23, and the defroster opening 20 and the side face opening 311 are opened and closed by the defroster door 21. Further, the center face opening 22 and the communication path 301a, and the foot inlet 24a are selectively opened and closed by the foot/face switching door 25. That is, the center face opening 22 and the side face opening 301, and the front foot opening 241 and the rear foot opening 242 are opened and closed by the foot/face switching door 25.

Similarly to the above-described first embodiment, the communication paths 30a and 31a into which conditioned air from the air mixing portion 19 flows are provided at both sides of the rotation shaft 21a in the vehicle front-rear direction to be adjacent to the rotation shaft 21a. The communication paths 30a, 31a communicate with the side face openings 30, 31, respectively. The first side face openings 30 and 31 and the second side face openings 301 and 302 are connected to side face air outlets provided on an upper side of the instrument panel at both right and left sides, so that conditioned air is blown toward the side windshields and right and left upper side parts of the passenger compartment.

As shown in FIG. 11, the side face openings 30, 31, 301, 311 communicating with the communication paths 30a, 31a, 301a, 311a are provided between the defroster opening 20 and the center face opening 22 in the vehicle front-rear direction within the width dimension of the center face opening 22 in the X—X direction approximately perpendicular to the arrangement direction of the defroster opening 20 and the center face opening 22.

Similarly to the first embodiment of the present invention, the defroster door 21 has both the recess portions 21c defining the communication openings. The recess portions 23c are recessed from both ends of the plate member 21b in the longitudinal direction of the rotation shaft 21a at a position adjacent to the rotation shaft 21a. That is, the recess portions 21c are provided in the defroster door 21 so that the first side face openings 30, 31 are always opened at an any rotation position of the defroster door 21. In addition, in the fourth embodiment, an air flow guide 21f having a L-shaped cross section is integrally formed with a lower end surface of the recess portion 21c, and an air flow guide 21g is integrally formed with the plate member 21b of the defroster door 21 at a side (i.e., vehicle front side) of the defroster opening 20.

Next, operation of the air conditioning unit 10 according to the fourth embodiment of the present invention will be now described.

When the defroster mode is set as shown in FIGS. 12A, 12B, the defroster opening 20 and the side face opening 311 are opened and the center face opening 22, the side face opening 301, the front foot opening 241 and the rear foot opening 242 are closed by the defroster door 21 and the foot/face switching door 25. Therefore, air blown by the blower unit is mainly blown toward the front windshield through the defroster opening 20. At this time, because the communication path 311a of the side face openings 311 is opened, air blown by the blower unit also flows into the side face openings 311. Although the defroster door 21 closes the communication path 23, the communication path 31a of the side face opening 31 communicates with the air mixing portion 19, and the communication path 30a of the side face opening 30 communicates with the air mixing portion 19 through the communication openings defined by the recess portion 21c of the defroster door 21 as shown in FIG. 12A. Therefore, conditioned air from the air mixing portion 19 flows into the communication paths 30a, 31a during the defroster mode. Accordingly, the other part of air blown by the blower unit is blown toward the side windshields of the vehicle from the side face air outlets through the side face openings 30, 31, 311.

In FIGS. 12A, 12B, the air mixing door 16 is operated to the maximum heating position during. the defroster mode. However, by rotating the air mixing door 16 from the maximum cooling position toward the maximum heating position, temperature of air blown into the passenger compartment can be arbitrarily adjusted.

When the bi-level mode is set, the defroster door 21 is operated at the chain line position in FIGS. 12A, 12B, so that the communication path 20a of the defroster opening 20 and the communication path 311a of the side face opening 311 are closed, and the communication path 23 is opened. At this time, the communication path 30a of the side fade opening 30 communicates with the air mixing portion 19, and the communication path 31a of the side face opening 31 communicates with the air mixing portion 19 through the communication openings defined by the recess portion 21c of the air mixing portion 19. Further, the foot/face switching door 25 is operated at a position (e.g., the chain line position 25c in FIGS. 12A, 12B between the foot inlet 24a, and the center face opening 22 and the communication path 301a, so that all the center face opening 22, the communication path 301a and the foot inlet 24a are opened.

During the bi-level mode, the air mixing door 16 is generally operated at a middle position between the maximum cooling position and the maximum heating position. Thus, air blown by the blower unit flows into the air conditioning unit 10 from the air inlet 14, and is cooled in the evaporator 12 while passing through the evaporator 12. A part of cool air from the evaporator 12 flows through the cool air bypass passage 15, and the other part thereof is introduced into the heater core 13 to be heated in the heater core 13. The ratio between an air amount flowing through the cool air bypass passage 15 and an air amount flowing through the heater core 13 is adjusted by the air mixing door 16.

Warm air heated in the heater core 13 flows toward the air mixing portion 19 after passing through the warm air passage 18 upwardly. In the air mixing portion 19, cool air from the cool air bypass passage 15 and warm air from the warm air passage 18 are mixed. However, the air passages of the air conditioning unit 10 are provided so that cool air mainly flows toward the face openings 22, 30, 31 301 and warm air mainly flows toward the foot openings 241, 242. Accordingly, temperature of air blown toward the face openings 22, 30, 31, 301 becomes lower than temperature of air blown toward the foot openings 241, 242. As a result, during the bi-level mode, temperature of air blown toward the head portion of a passenger in the passenger compartment can be made lower than temperature of air blown toward the foot portion of the passenger in the passenger compartment, and a pleasant temperature distribution of "cool head and warm foot" can be obtained.

When a face mode is set as shown in FIGS. 13A and 13B, the defroster door 21 closes the defroster opening 20 and the side face opening 311. Further, the foot/face switching door 25 is operated so that the foot inlet 24a of the foot openings 241, 242 is closed and the center face opening 22 and the side face opening 301 are fully opened. During the face mode, the communication paths 30a of the side face openings 30 communicate with the air mixing portion 19, and the communication paths 31a of the side face openings 31 also communicate with the air mixing portion 19 through the communication openings defined by the recess portions 21c of the defroster door 21, similarly to the bi-level mode. Accordingly, during the face mode, air blown by the blower unit flows toward the head portion of the passenger from the center face air outlet through the center face opening 22, and also flows toward the right and left upper sides of the passenger compartment from the side face air outlets through the side face openings 30, 31, 301.

Next, when the foot mode is set as shown in FIGS. 14A, 14B, the defroster door 21 is operated to slightly open the communication path 20a of the defroster opening 20 and the communication path 311a, and to greatly open the communication path 23. Further, the foot/face switching door 25 is operated to close the center face opening 22 and the communication path 301a. Accordingly, the foot inlet 24a of the foot openings 241, 242 is greatly opened, and the defroster opening 20 and the side face opening 311 are slightly opened. In addition, the communication paths 30a, 31a of the side face openings 30, 31 communicate with the air mixing portion 19. Thus, during the foot mode, warm air is blown toward the foot area of the passenger to heat the passenger compartment, and defrosting of the windshield is also performed.

In the fourth embodiment of the present invention, the air flow guide 21g is disposed on the defroster door 21 at a side of the defroster opening 20, so that an air amount flowing into the defroster opening 20 is controlled at a small amount. Further, even when the operation position of the defroster door 21 is shifted to a direction opening the communication path 20a, it can prevent the air amount flowing into the defroster opening from being greatly increased by the air flow guide 21g.

When the foot/defroster mode is set from the foot mode, the defroster door 21 is rotated to the clockwise direction by a predetermined angle, so that the opening degrees of the communication path 20a of the defroster opening 20 and the communication path 311a become larger and the opening degree of the communication path 23 becomes smaller, as compared with the foot mode. During the foot/defroster mode, an amount of air blown into the defroster opening 20 is increased, and an amount of air blown into the foot openings 241, 242 is reduced, as compared with the foot mode.

According to the fourth embodiment of the present invention, because the air flow guide 21f is provided on the defroster door 21, warm air introduced into the air mixing portion 19 through the warm air passage 18 can be prevented from greatly flowing into the side face openings 30, 31 from the communication paths 30a, 31a, and is guided to readily flow into the foot openings 241, 242.

According to the fourth embodiment, the dimension of the air conditioning case 11 for defining the center face opening 22, the defroster opening 20 and the side face openings 30, 31 in the X—X direction can be reduced, without increasing the operation force of the foot/face switching door 25 for opening and closing the center face opening 22. Further, during all air outlet modes, air is blown from the side face air outlets.

Further, during the foot mode where the foot openings 241, 242 having the large air flow resistance are opened and the center face opening 22 having the small air flow resistance is closed, the side face opening 301 is closed so that the air amount of air blown from the foot openings 241, 242 is increased. During the face mode where the foot openings 241, 242 having the large air flow resistance are closed and the center face opening 22 having the small air flow resistance is opened, the side face opening 301 is opened so that the amount of air blown from the side face air outlets is increased. Further, during the defroster mode where the foot openings 241, 242 having the large air flow resistance are closed and the defroster opening 20 having the small air flow resistance is opened, the side face opening 311 is opened so that it can prevent an air flow ratio from the side face air outlets from being greatly reduced.

FIG. 15 shows an air amount ratio (%) blown from air outlets, that is, the center face air outlet, the side face air outlet, the foot air outlet and the defroster air outlet, during the face mode, the bi-level mode, the foot mode, the foot/defroster mode and the defroster mode. As shown in FIG. 15, during the face mode, the air flow ratio blown from the side face air outlet is set at 45% by opening the side face opening 301, relative to the foot mode. Therefore, it can prevent the air amount ratio blown from the side face air outlet from being decreased during the face mode where the foot openings 241, 242 having the large flow resistance are closed and the center face opening 22 having the small flow resistance is opened.

Further, during the defroster mode where the foot openings 241, 242 having the large flow resistance are closed and the defroster opening 20 having the small flow resistance is opened, the side face opening 311 is opened so that the air amount ratio from the side face air outlet can be set at 30%. According to experiments of the inventors of the present invention, when the side face opening 311 is not provided, the air amount ratio blown from the side face air outlet is 20% during the defroster mode. As shown in FIG. 15, in the fourth embodiment, it can prevent air blown from the side face air outlet from being greatly changed in different air outlet modes.

Although the present invention has been fully described in connection with the preferred embodiments thereof with reference to the accompanying drawings, it is to be noted that various changes and modifications will become apparent to those skilled in the art.

For example, in the above-described embodiments, the side face openings 30, 31 are provided between the defroster opening 20 and the center face opening 22. However, the side face openings 30, 31 may be provided between the center face opening 22 and the other air opening such as the foot opening 24.

In the above-described embodiments, the side face openings 30, 31 are provided in the upper wall surface of the air conditioning case 11 at a vehicle front side of the center face opening 22. However, at least any one of the side face openings 30, 31 may be provided at a vehicle rear side of the center face opening 22. In the above-described embodiments, the arrangement direction of the air conditioning unit 10, such as the vehicle front-rear direction, the vehicle right-left direction and the vehicle up-down direction, is indicated. However, the arrangement direction of the air conditioning unit can be changed in a vehicle.

In the above-descried embodiments, an opening area of each side face opening 30 is approximately equal to that of each side face opening 31. However, the opening areas of the side face openings 30 and the side face openings 31 may be arbitrarily changed in accordance with a set air flow distribution.

In the above-described first embodiment, the recess portions 21c are formed in the defroster door 21 to define the rectangular communication opening. However, any the other shape of the communication opening, such as a triangle shape and a round shape, may be provided by the recess portion 21c of the defroster door 21.

Figure 16:
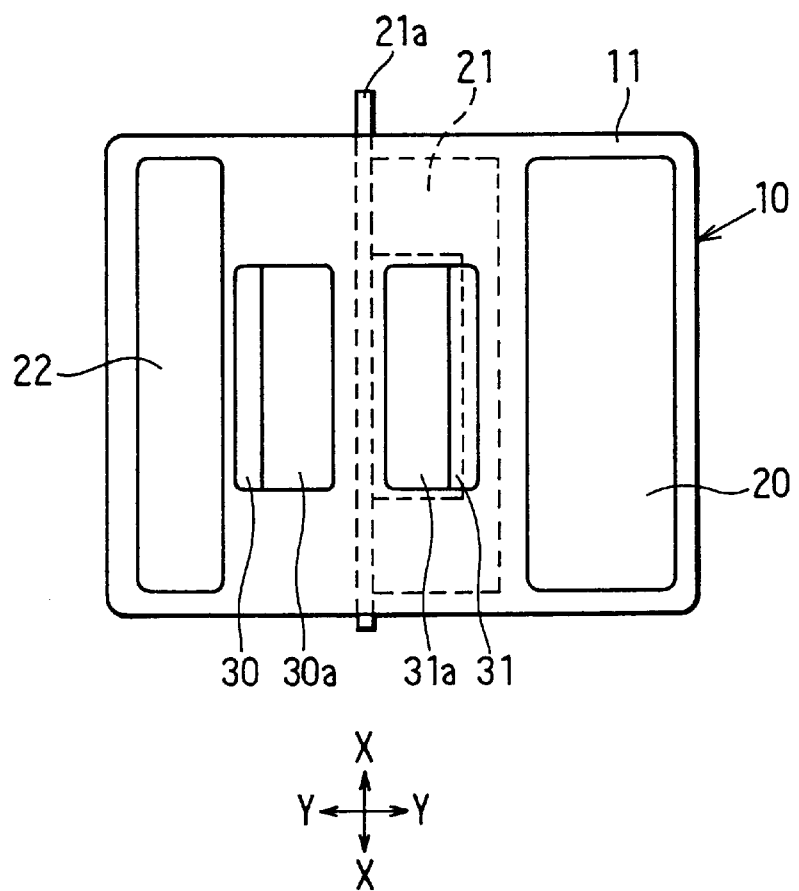
FIG. 16 is a top view of an air conditioning unit in which side face openings are provided at an approximate center position of a rotation shaft of a defroster door, proximate to the rotation shaft, according to a modification of the present invention.
Figure 17:
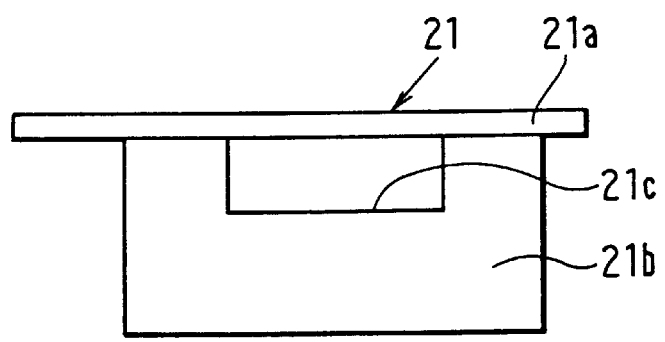
FIG. 17 is a front view of a defroster door disposed in the air conditioning unit of FIG. 16 according to the modification of the present invention.

In the above-described first embodiment of the present invention, the side face openings 30, 31 are provided on both sides of the rotation shaft 21a of the defroster door 21 at both longitudinal end sides, and the recess portions 21c of the defroster door 21 are also provided on both sides of the rotation shaft 21b at the longitudinal end sides to correspond to the communication paths 30a, 31a of the side face openings 30, 31. However, as shown in FIGS. 16 and 17, the side face openings 30, 31 may be provided at an approximate center portion of the defroster door 21 in the longitudinal direction of the rotation shaft 21a, and a communication opening can be provided in the defroster door 21 to correspond to the communication paths 30a, 31a of the side face openings 30, 31.

In the above-described first embodiment, the recess portion 21c is provided in the defroster door 21. However, in a case where the opening areas of the side face openings 30, 20 31 can be increased without providing the recess portion 21c in the defroster door 21 so that a sufficient air amount can be blown from the side face air outlets, an any recess portion 21c is not provided in the defroster door 21.

Figure 18:
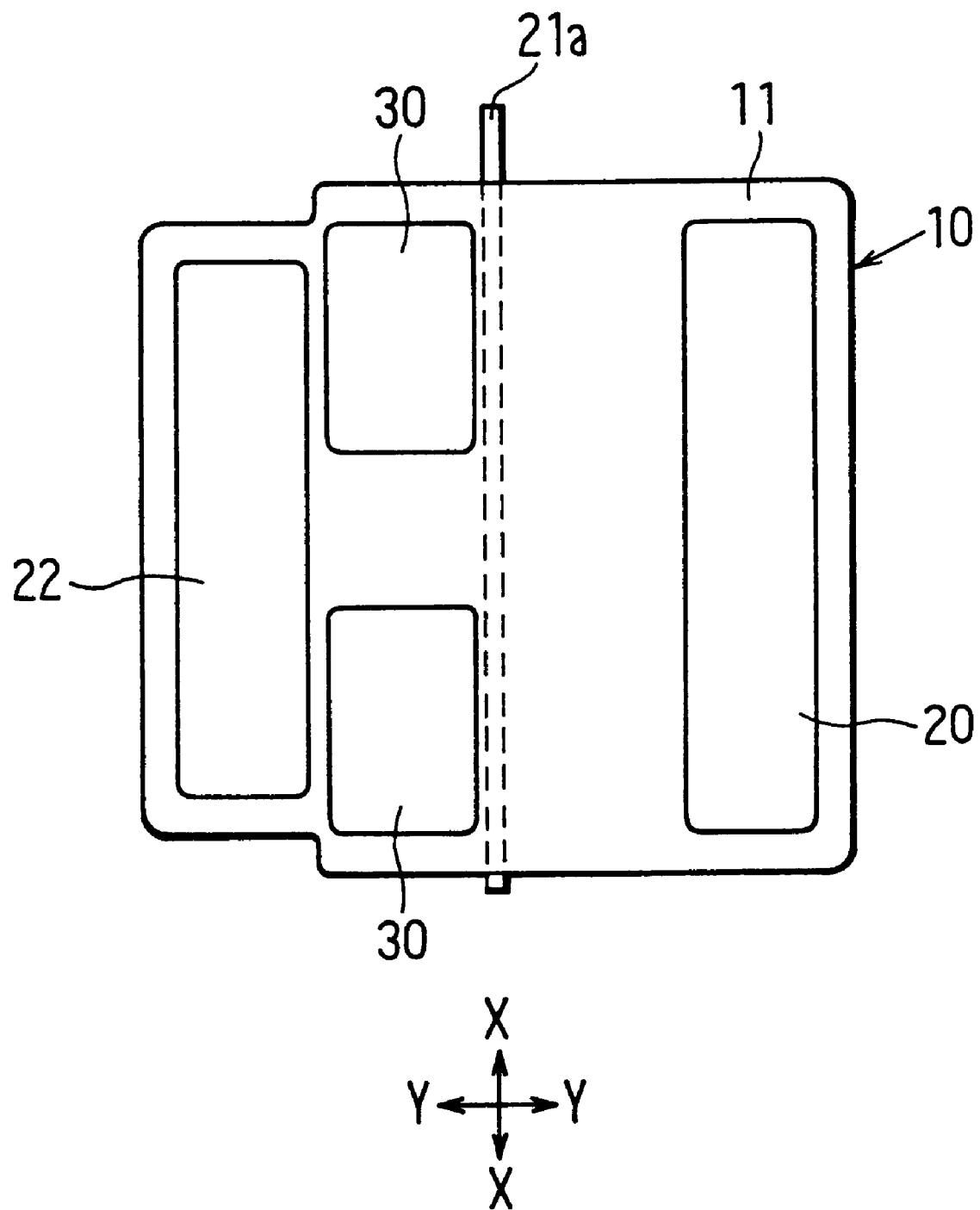
FIG. 18 is a top view of an air conditioning unit where side face openings are provided at one side relative to a rotation shaft of a defroster door, according to an another modification of the present invention.

Further, in the above-described third embodiment of the present invention, both the side face openings 30a and 31a are provided at both sides of the defroster opening 20 and the center face opening 22, relative to the rotation shaft 21a of the defroster door 21. However, the side face opening 30, 31 can be provided at a one side relative to the rotation shaft 21a of the defroster door 21. Further, only a one side face opening 30 can be provided at one side of the rotation shaft 21a, as shown in FIG. 18.

In the fourth embodiment, the side face opening 311 is provided to be opened during the defroster mode. However, when the air flow resistance in the defroster opening 20 is approximately equal to or larger than the air flow resistance in the foot openings 241, 242, the side face opening 311 is not necessary.

In the above-described embodiments, the operations of the doors 16, 21, 25 are performed by the actuator such as the servomotor through the link mechanism. However, the operations of the doors 16, 21, 25 may be manually performed by using a manual operation member such as a temperature control lever and an air outlet mode lever through an operation cable.

The present invention may be applied to an air conditioning unit where the evaporator 12 is not provided. In the above-described first through third embodiments, a rear foot opening through which warm air is blown toward the foot area of a passenger on a rear seat of the passenger compartment may be provided in addition to the foot opening 24. Further, in the fourth embodiment, both the front foot opening 241 and the rear foot opening 242 are provided. However, in the fourth embodiment, only the front foot opening 241 is provided and the rear foot opening 242 may be omitted.

Such changes and modifications are to be understood as being within the scope of the present invention as defined by the appended claims.

What is claimed is:

1. An air conditioner for a vehicle having a passenger compartment, comprising:

an air conditioning case for defining an air passage through which air is blown toward the passenger compartment, said air conditioning case having;
 a center face opening through which air is blown toward a center upper side of the passenger compartment in a vehicle right-left direction,
 a side face opening through which air is blown toward a side upper side of the passenger compartment in the vehicle right-left direction or a side windshield of the vehicle, and
 an air opening provided separately from said center face opening and said side face opening, said air opening being positioned in an arrangement direction with respect to said center face opening;
a heat exchanger disposed in said air conditioning case, for performing a heat exchange between air passing therethrough and a fluid flowing therein;
a temperature adjustment unit for adjusting temperature of air blown into the passenger compartment, by controlling a heat-exchanging amount of air passing through said heat exchanger; and
a mode switching unit, disposed at a downstream air side of said temperature adjustment unit, for opening and closing said center face opening, wherein, at least a part of said side face opening is positioned within a width dimension of said center face opening, said width dimension being perpendicular to said arrangement direction of said center face opening and said air opening; and
said side face opening is provided between said center face opening and said air opening in the arrangement direction of said center face opening and said air opening.

2. The air conditioner according to claim 1, wherein all of said side face opening is provided within said width dimension of said center face opening in the direction perpendicular to the arrangement direction.

3. The air conditioner according to claim 1, wherein:
said side face opening has a first part provided inside the width dimension of said center face opening in the direction perpendicular to the arrangement direction, and a second part provided outside the width dimension of said center face opening in the direction perpendicular to the arrangement direction; and
said first part has an opening area larger than that of said second part.

4. The air conditioner according to claim 1, wherein:
said air conditioning case has therein a first communication path communicating with said center face opening, and a second communication path communicating with said air opening; and
said mode switching unit is disposed to selectively open and close said first communication path and said second communication path.

5. An air conditioner for a vehicle having a passenger compartment, comprising:
an air conditioning case for defining an air passage through which air is blown toward the passenger compartment, said air conditioning case having:
a center face opening through which air is blown toward a center upper side of the passenger compartment in a vehicle right-left direction,
a side face opening through which air is blown toward a side upper side of the passenger compartment in the vehicle right-left direction or a side windshield of the vehicle, and
an air opening provided separately from said center face opening and said side face opening, said air opening being positioned in an arrangement direction with respect to said center face opening;
a heat exchanger disposed in said air conditioning case, for performing a heat exchange between air passing therethrough and a fluid flowing therein;
a temperature adjustment unit for adjusting temperature of air blown into the passenger compartment, by controlling a heat-exchanging amount of air in said heat exchanger; and
a mode switching unit, disposed at a downstream air side of said temperature adjustment unit, for selectively opening and closing said center face opening and said air opening; wherein:
at least a part of said side face opening is positioned within a width dimension of said center face opening, said width dimension being perpendicular to said arrangement direction of said center face opening and said air opening;
said air conditioning case has therein a first communication path communicating with said center face opening, and a second communication path communicating with said air opening;
said mode switching unit is disposed to selectively open and close said first communication path and said second communication path;
said mode switching unit is a door having a rotation shaft rotatbly held in said air conditioning case and a plate member disposed in said rotation shaft to be operated by said rotation shaft;
said side face opening is provided at least at one side of said center face opening and said air opening relative to said rotation shaft; and
said plate member has an air passage part communicating with said side face opening.

6. The air conditioner according to claim 5, wherein said side face opening is provided at both sides of said center face opening and said air opening relative to said rotation shaft, between said face opening and said air opening in the arrangement direction.

7. The air conditioner according to claim 5, wherein:
when said plate member closes said first communication path, said side face opening communicates with an upstream air side of said plate member through said air passage part of said plate member.

8. The air conditioner according to claim 1, wherein said air conditioning case is mounted on the passenger compartment in such a manner that the arrangement direction is approximately in a vehicle front-rear direction.

9. The air conditioner according to claim 1, wherein said side face opening includes plural opening parts provided at both end sides of said center face opening in the direction perpendicular to the arrangement direction.

10. The air conditioner according to claim 1, wherein:
said air opening includes a defroster opening through which air is blown toward a front windshield of the vehicle, and a foot opening through which air is blown toward a lower side of the passenger compartment;
said air conditioning case has therein a communication path communicating with both said center face opening and said foot opening;
said mode switching unit includes a first switching member which opens and closes said center face opening and said foot opening, and a second switching member which opens and closes said defroster opening and said communication path; and
each of said first switching member and said second switching member is a plate-like door having a rotation shaft and a plate member rotated by said rotation shaft.

11. The air conditioner according to claim 1, wherein:
said mode switching unit includes a door having a rotation shaft disposed between said center face opening and said air opening, and a plate member disposed on said rotation shaft; and
said side face opening is provided at both sides of said rotation shaft in said arrangement direction.

12. An air conditioner for a vehicle having a passenger compartment, comprising:
an air conditioning case for defining an air passage through which air is blown toward the passenger compartment, said air conditioning case having:
a center face opening through which air is blown toward a center upper side of the passenger compartment in a vehicle right-left direction,
a side face opening through which air is blown toward a side upper side of the passenger compartment in the vehicle right-left direction or a side windshield of the vehicle, and
an air opening provided separately from said center face opening and said side face opening, said air opening being positioned in an arrangement direction with respect to said center face opening;
a heat exchanger disposed in said air conditioning case, for performing a heat exchange between air passing therethrough and a fluid flowing therein;
a temperature adjustment unit for adjusting temperature of air blown into the passenger compartment, by controlling a heat-exchanging amount of air in said heat exchanger; and
a mode switching unit, disposed at a downstream air side of said temperature adjustment unit, for selectively opening and closing said center face opening and said air opening; wherein:

at least a part of said side face opening is positioned within a width dimension of said center face opening, said width dimension being perpendicular to said arrangement direction of said center face opening and said air opening;

said side face opening includes a first side face opening part and a second side face opening part provided separately from said first side face opening part in the direction perpendicular to the arrangement direction;

said center face opening and said air opening includes a first opening part having an air flow resistance smaller than a predetermined value;

said air opening includes a second opening part having an air flow resistance larger than the predetermined value;

during a first air outlet mode where said first opening part is closed and said second opening part is opened, said first side face opening part is opened and said second side face opening part is closed; and during a second air outlet mode where said first opening part is opened and said second opening part is closed, both said first side face opening part and said second side face opening part are opened.

13. The air conditioner according to claim 12, wherein:

said side face opening includes both said second side face opening parts;

said second air outlet mode has a first state where said center face opening is opened and a second state where said center face opening is closed;

during said first state of said second air outlet mode, one of said second side face opening parts is opened and the other one of said second side face opening parts is closed; and during said second state of said second air outlet mode, one of said second side face opening parts is closed and the other one of said second side face opening parts is opened.

14. The air conditioner according to claim 1, wherein said heat exchanger includes a heating heat exchanger for heating air flowing therethrough.

15. The air conditioner according to claim 1, wherein:

said air opening includes a defroster opening through which air is blown toward a front windshield of the passenger compartment; and said side face opening is provided between said center face opening and said defroster opening in an arrangement direction of said center face opening and said defroster opening.

16. The air conditioner according to claim 15, wherein:

said mode switching unit includes a switching door for opening and closing said center face opening and said defroster opening; and said side face opening is provided at both sides of said center face opening and said defroster opening relative to a rotation shaft of said switching door.

17. An air conditioner for a vehicle having a passenger compartment, comprising:

an air conditioning case for defining an air passage through which air is blown toward the passenger compartment, said air conditioning case having:

a center face opening through which air is blown toward a center upper side of the passenger compartment in a vehicle right-left direction, a side face opening through which air is blown toward a side upper side of the passenger compartment in the vehicle right-left direction or a side windshield of the vehicle, and an air opening provided separately from said center face opening and said side face opening said air opening being positioned in an arrangement direction with respect to said center face opening;

a heat exchanger disposed in said air conditioning case, for performing a heat exchange between air passing therethrough and a fluid flowing therein;

a temperature adjustment unit for adjusting temperature of air blown into the passenger compartment, by controlling a heat-exchanging amount of air in said heat exchanger; and a mode switching unit, disposed at a downstream air side of said temperature adjustment unit, for selectively opening and closing said center face opening and said air opening wherein:

at least a part of said side face opening is positioned within a width dimension of said center face opening, said width dimension being perpendicular to said arrangement direction of said center face opening and said air opening;

said air opening includes a defroster opening through which air is blown toward a front windshield of the passenger compartment;

said side face opening is provided between said center face opening and said defroster opening in an arrangement direction of said center face opening and said defroster opening;

said mode switching unit includes a switching door for opening and closing said center face opening and said defroster opening;

said side face opening is provided at both sides of said center face opening and said defroster opening relative to a rotation shaft of said switching door;

said switching door has a plate member operated by said rotation shaft, for opening and closing said center face opening and said defroster opening; and said plate member is formed into a shape having an opening corresponding to said side face opening in such a manner that side face opening is always opened regardless of a position of said plate member.

18. The air conditioner according to claim 1, wherein said center face opening is coupled through a duct with a center face air outlet provided on an instrument panel in the passenger compartment at an upper center side in the vehicle right-left direction.

19. An air conditioner for a vehicle having a passenger compartment, comprising:

an air conditioning case for defining an air passage through which air is blown into the passenger compartment, said air conditioning case having:

a center face opening through which air is blown toward a center upper side of the passenger compartment in a vehicle right-left direction, a side face opening through which air is blown toward a side upper side of the passenger compartment in the vehicle right-left direction or a side windshield of the vehicle, and an air opening provided separately from said center face opening and said side face opening; and a mode switching unit for opening and closing said center face opening, wherein;
said side face opening is provided between said center face opening and said air opening in an arrangement direction of said center face opening and said air opening; and
at least face opening is provided between said center face opening and said side face opening in an arrangement direction of said center face opening and said air opening; and at least a part of said side face opening is positioned within a width dimension of said center face opening in a direction perpendicular to the arrangement direction of said center face opening and said air opening.

20. The air conditioner according to claim 19, wherein the mode switching unit is disposed to selectively open and close said center face opening and said air opening.

* * * * *